Dec. 8, 1959 C. F. ANDERSON ET AL 2,916,550

TELESCRIBING APPARATUS

Filed Oct. 15, 1956 4 Sheets-Sheet 1

INVENTORS
Carl F. Anderson
George S. Corbeil
By Smyth & Roston
Attorneys

TELESCRIBING APPARATUS

INVENTORS:
Carl F. Anderson
George L. Corbeil
By Smyth & Roston
Attorneys

Dec. 8, 1959 C. F. ANDERSON ET AL 2,916,550

TELESCRIBING APPARATUS

Filed Oct. 15, 1956 4 Sheets-Sheet 3

INVENTORS:
Carl F Anderson
George S. Corbeil

By Smyth & Roston
Attorneys

Dec. 8, 1959 C. F. ANDERSON ET AL 2,916,550

TELESCRIBING APPARATUS

Filed Oct. 15, 1956 4 Sheets-Sheet 4

INVENTORS
Carl F. Anderson
George S. Corbeil

By Smyth + Roston
Attorneys

United States Patent Office 2,916,550

Patented Dec. 8, 1959

2,916,550

TELESCRIBING APPARATUS

Carl F. Anderson, Los Angeles, and George S. Corbeil, Rolling Hills, Calif., assignors to Telautograph Corporation, Los Angeles, Calif., a corporation of Virginia Application October 15, 1956, Serial No. 615,834

12 Claims. (Cl. 178—19)

The present invention relates to telescribing apparatus and systems for automatically duplicating at one or more remote receiving stations written messages transcribed at a central transmitting station. The invention is more particularly concerned with telescribing systems which utilize frequency shift principles for transmitting information from the transmitting station to the receiving stations.

Telescribing systems in general are well known. These systems are so devised that the movements of a stylus at a transmitting station are followed and reproduced by corresponding movements of a pen or other suitable writing instrument at each of a plurality of receiving stations. Therefore, any written message at the transmitting station is immediately duplicated at each of the receiving stations. Telescribing systems are useful in a wide variety of different applications. For example, telescribing systems are useful in banks for rapidly checking an individual's signature in the various departments of the institution. Also, the equipment is useful in the multi-plant operations of large corporations disseminating instructions and orders to various subordinates over the signature of a supervising officer.

Copending application Ser. No. 552,542, filed December 12, 1955, in the name of Carl F. Anderson et al., describes and claims a telescribing system in which the motion of a stylus at the transmitting station produces frequency shifts for each of two frequency-displaced signals. This application of frequency shift principles to telescribing transmissions overcomes many of the problems that originally arose due to the effect of signal attenuation and noise on faithful reproduction at the receiving station. Also, this application of frequency shift principles enables existing telephone lines and equipment to be used for transmitting the information to the various receiving stations, as is fully described in the copending application referred to above.

In the system disclosed in the copending application, the stylus at the transmitter is made to shift the frequencies of a pair of oscillators as it is moved over the surface of a transcribing tablet. The first oscillator has a certain predetermined center frequency of, for example, 2300 cycles, and the stylus varies this frequency by, for example, plus or minus 30 cycles as it is moved along one diagonal of the tablet. The second oscillator has a different predetermined center frequency of, for example, 1700 cycles, and the stylus varies this latter frequency by, for example, plus or minus 30 cycles as it is moved along the other diagonal of the tablet. Therefore, any position that the stylus at the transmitting station might have on the tablet at any particular time is represented by a particular positive or negative shift in the frequency of each of the oscillator output signals with respect to their respective center frequencies. To control the position of the pens at the receiving stations, the two oscillator signals are transmitted to the receivers and the pens are moved in a manner to be described in accordance with the frequency shifts of the two signals.

To achieve the desired control of the receiver pens, each receiving station includes a pair of frequency discriminators, one for each of the two frequency shifted transmitted oscillator signals. These frequency discriminators are controlled to provide respective output voltages which vary as the frequency of the two oscillator signals are shifted in response to movements of the stylus at the transmitting station. These discriminator output voltages are utilized to control the position of the pen. It is clear that the discriminators at each of the receiving stations must be an extremely linear response. Only with such linearity can the pens at the receiving stations be expected faithfully to duplicate the written messages at the transmitting station.

Most known types of frequency discriminators exhibit a desired degree of linearity throughout a relatively wide range about their zero voltage point. That is, for linear operation of these frequency discriminators throughout an optimum range of frequency shifts of an applied signal, the center frequency of the applied signal should cause the discriminator to develop essentially zero voltage. Then, frequency shifts on either side of this center frequency cause the discriminator to develop positive and negative output voltages which are linearly related to the frequency shifts throughout a relatively wide range.

It is evident, therefore, that for the most efficient use of the frequency discrimnators, they should be operated on either side of their "zero voltage" point. This, however, creates several problems, which will be discussed.

It is desirable at a receiving station to introduce the output voltages from the discriminators to respective direct-current amplifiers. These amplifiers include the control windings of the respective driving motors for the receiver pen in their respective output circuits, and the amplifiers transform these voltages to amplified drive currents for the pen motors.

Now, if the discriminators are to be used in conjunction with such direct-current amplifiers, and if they are to be operated through their zero voltage points for optimum linearity range, it is clear that unless other provisions are made, the direct-current amplifiers must be biased to be conductive for zero output voltage from the discriminators. Only then can the positive and negative swings of the discriminator voltages produce desired variations in the current through the amplifiers and through the windings of the pen motors. This, however, produces a problem as to the proper control of the receiver pens at the end of a message. For example, if the message is terminated with zero output voltage from the discriminators, this would correspond to the stylus at the transmitter and the receiver pens being positioned at the centers of their respective inscribing surfaces. This not only places the receiver pens in a position in which they interfere with the reading of the message, but it also causes them to be jerked to a zero current position when the receiver circuit is de-energized and the currents through the direct-current amplifiers fall to zero. Alternately, if the message is terminated with maximum negative output voltages from the discriminators and through the direct-current amplifiers, the pens would be in a more desirable position since this corresponds to a position of the stylus and pens to one side of the inscribing surfaces. However, whenever the signals from the transmitter are discontinued, the resulting drop of the discriminator output voltages from maximum negative to zero would cause the receiver pens to be jerked from the side to the center of the inscribing surfaces.

Therefore, without further control and under the conditions described above, not only are the pens at the receiving stations shifted to an undesirable center position at the end of a message or when the receiver equipment is turned off but jerking of the pens occurs which damages the linkage to the pens and causes ink spillage.

The present invention provides an improved telescribing system using frequency shift principles. The system of the invention also uses frequency discriminators at the receiving stations, each operating through substantially the entire range of the linear portion of its characteristic frequency vs. output voltage curve. The system of the invention, however, is constructed in a manner to be described to permit each receiver pen to be moved under the control of the transmitting stylus to a position of rest to one side and clear of its transcribing surface. Moreover, the system of the invention is such that all controls exerted on the receiver pens are smooth and do not produce jerking of the pens. Also, when the pens have been moved to their rest position at the end of a message, neither the discontinuance of the signals nor the de-energizing of the receiver circuit disturbs the pens in any way.

In accordance with the invention, a control voltage is produced upon the receipt of the signals from the transmitter. This control voltage is used effectively to shift the operating point of the discriminators without affecting their linear characteristics. This permits the direct-current amplifiers to be biased to a non-conductive state in the absence of an applied signal. The control voltage, for example, causes the discriminators to produce only unidirectional positive output voltages upon the receipt of the signals. These positive voltages produce the desired variations in the currents through the amplifiers from zero to a maximum, and through the windings of the pen motors. Then upon the discontinuance of the signals, the discriminator output immediately drops to zero for zero current through the amplifiers and through the motor windings.

It is evident that any variation in the amplitude of the control voltage developed by the control system of the invention would produce spurious variations in the output voltages from the discriminators and in the current through the amplifiers and through the motor windings. Accordingly, the control system of the invention is constructed to produce upon the receipt of both of the signals from the transmitter, a control voltage having an amplitude that is fixed and stable and which is absolutely independent of any normal variations in amplitude of either of the received signals.

The control system of the invention is also constructed to be relatively insensitive to the effect of noise pulses and other extraneous signals which would otherwise tend to produce kicks and jerks in the motion of the pens at the receiving stations. Moreover, the control system is designed so that the control voltage developed upon the receipt of both of the transmitted signals rapidly disappears upon the discontinuance of the signals. The control voltage, therefore, does not have a tendency to produce unwanted kicks in the motion of the pens on the receiving stations. As previously noted, kicks and jerks of the receiver pens tends to damage their linkages and causes them to throw ink.

In telescribing systems using frequency shift principles, it is extremely important that signal amplitudes and the value of the direct exciting voltages at the receiving stations be rigidly maintained constant. Any variation in the amplitude of the received signals or fluctuations in the direct voltages can produce spurious control effects upon the pen. The invention also provides circuits for use at a receiving station which are capable of amplifying the received signals and yet of holding the amplitude variations in the received signals. This controlled amplification is achieved without imparting any distorting effects to the signals translated by the amplifier. Such distortion would tend to develop unwanted harmonics and other undesired effects.

The invention also provides an improved control system for use at a receiver for holding the direct exciting voltages essentially constant and not subject to undesired fluctuations. This latter control system also includes means for producing a slight variation in the direct exciting voltages to compensate for variations in the conductivity of certain direct-current amplifiers due to thermal changes within the amplifier tubes.

In the drawings:

Figure 1 is a block diagram of apparatus at a transmitting station for converting the movements of a stylus over a transcribing surface into shifts in the frequency of a pair of transmitted signals, and of apparatus at a receiving station for converting the frequency shifted signals into control effects for causing a pen at the receiving station to track the movements of the stylus at the transmitting station;

Figure 2 is a circuit diagram, partly in block form, illustrating in detail apparatus for converting the movements of the stylus at the transmitting station into the transmitted signals, the frequencies of these signals being shfted about respective center frequencies as the stylus is moved about its inscribing surface, this figure also showing apparatus for controlling the transmission of such frequency shifted signals;

Figure 1:
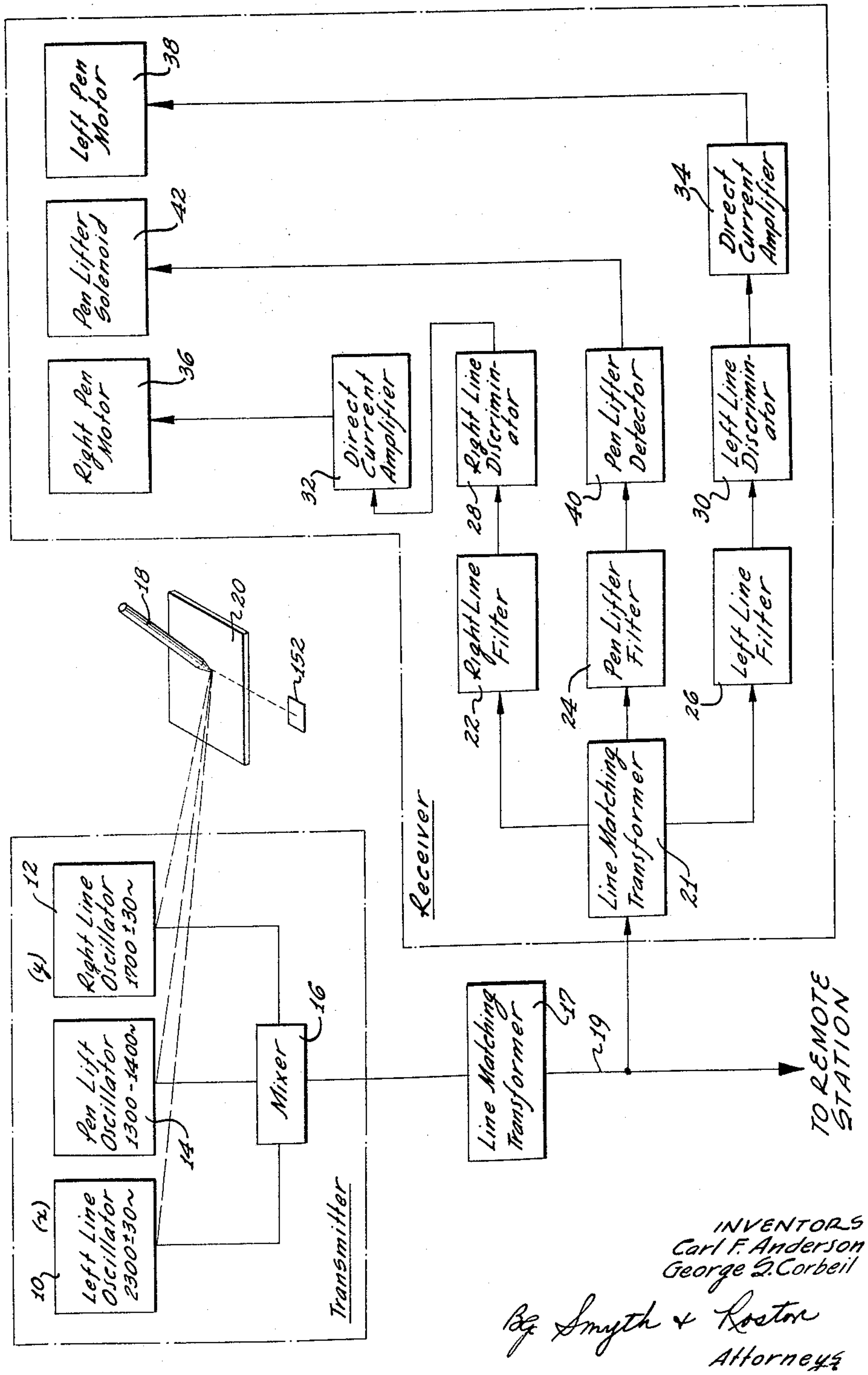

The block diagram of Figure 1 shows three oscillators 10, 12 and 14 which are included in the circuit of the transmitting station. These oscillators are coupled to a linear mixer 16, and the mixer is in turn connected to an impedance matching transformer 17. The transformer 17 is coupled to a suitable transmission line 19 and its function is to match the output impedance of the transmitter circuit with the impedance of the transmission line. Such impedance matching provides optimum transfer of energy from the transmitter to the transmission line 19. As previously noted, the transmission line may conveniently be an existing telephone line.

The frequency of the oscillator 10, which shall be termed the "left line" oscillator, is controlled and shifted by a stylus 18. The stylus is coupled to the oscillator in a manner such that as it moved along the left diagonal of an inscribing tablet 20 it shifts the oscillator frequency from a minimum to a maximum. For example, the oscillator 10 may have a predetermined center frequency of 2300 cycles, and this frequency is shifted by plus or minus 30 cycles as the stylus 18 is moved from the center of the tablet 20 up or down the left diagonal of the tablet. The left diagonal may be defined as a line extending from the lower left corner of the tablet 20 to the upper right corner of the tablet.

The oscillator 12, which shall be termed the "right line" oscillator, may have, for example, a predetermined center frequency of 1700 cycles. The frequency of this latter oscillator may be controlled and shifted by the movements of the stylus 18 along the right diagonal of the tablet 20. The lower right diagonal may be defined as a line extending from the lower right corner of the tablet 20 to the upper left corner of the tablet. For example, the stylus is coupled to the latter oscillator in such a manner that as it is moved from the center of the tablet up the right diagonal, it increases the frequency of the oscillator 12 from 1700 to 1730 cycles. Alternately, when the stylus 18 is moved from the center of the tablet down the right diagonal, it decreases the frequency of the oscillator 12, for example, from 1700 to 1670 cycles. In this manner, any position to which the stylus 18 is set at any particular instant on the tablet 20 is accompanied by a corresponding particular frequency shift in the left line oscillator 10 and by another corresponding frequency shift in the right line oscillator 12.

It will be remembered that the inscribing motion of the stylus 18 on the tablet 20 is accompanied by a corresponding writing motion of the pens at the receiving stations. It is evident that whenever the stylus 18 is lifted from the tablet 20, the pen at each receiving station should also be lifted so that it will not inscribe extraneous lines over its writing surface. This lifting control of the receiver pens is achieved by means of the oscillator 14 which shall be termed the "pen lifter" oscillator. Whenever the stylus 18 is pushed down on the tablet 20 to inscribe a message, it opens a spring-loaded switch that is positioned under the tablet. This causes the frequency of the oscillator 14 to be established at a selected value. On the other hand, when the stylus 18 is lifted from the tablet 20, this switch closes and the oscillator 14 is established at a second frequency. Each receiving station includes a filter circuit, as will be described, which is constructed to pass only a signal at the second frequency from the oscillator 14 indicating that the transmitter stylus is raised. This signal is then used to energize a solenoid which lifts the pen at the receiving station from its inscribing surface. In this manner, whenever the stylus 18 is lifted from the tablet 20, the pen at each receiving station is also lifted from its inscribing surface. The pen lifter oscillator 14 may be constructed, for example, to have a frequency of 1400 cycles when the stylus 18 is pressed down on the tablet 20 to open the switch, and this oscillator may have a frequency of 1300 cycles whenever the stylus 18 is raised from the tablet 20 and the switch is closed. The receiving stations, then, are constructed to select only the 1300 cycle signal.

The three signals from the oscillators 10, 12 and 14 are combined in the mixer 16, and they are then applied to the impedance matching transformer 17. The mixer 16 is extremely linear so as to eliminate any tendency for harmonics to be formed due to heterodyning of the three signals. Because the three signals are frequency displaced from one another they may conveniently be transmitted over a single transmission line. They may then be individually selected at each receiving station by suitable filters. The suggested frequencies for these signals are appropriate for transmission over present day telephone lines.

The transmission line 19 is connected at a typical receiving station to the primary winding of an impedance matching transformer 21. The secondary winding of the transformer is connected to three filters 22, 24 and 26: the transformer matches the impedance of the transmission line 19 with the input impedance of these filters for optimum energy transfer.

The filter 22 is designed to select the frequency shifted signal from the right line oscillator 12. For example, the filter 22 may be designed to pass a band of signal frequencies of the order of 1700 $\pm 40$ cycles. The filter 22 is connected to a frequency discriminator 28 which shall be termed the "right line" discriminator. The output terminal of the discriminator 28 is connected to a direct-current amplifier 32. The amplifier 32 includes the control winding of a motor 36 in its output circuit. The motor 36 shall be termed the "right pen" motor, and it is linked to the pen at the receiving station in a manner to be described.

The filter 26 is designed to pass the signal frequencies of the order of 2300 cycles $\pm 60$ and the filter 26 is designed to select the frequency shifted signal from the left line oscillator 10. The output terminal of the filter 26 is connected to a frequency discriminator 30 which shall be termed the "left line" discriminator. The output terminal of the discriminator 30 is connected to a direct current amplifier 34, and this amplifier has the control winding of a control motor 38 in its output circuit. The motor 38 shall be termed the "left pen" motor and is linked to the pen at the receiver in a manner to be described.

The filter 24, unlike the filters 22 and 26, is designed to have extremely sharp characteristics and this filter is intended to pass the signal from the pen lifter oscillator 14 only when its frequency corresponds to the stylus 18 in its up position removed from the tablet 10. For example, the filter 24 may be designed to pass the signal from the oscillator 14, when its frequency is 1300 cycles, but to attenuate completely the signal when its frequency is shifted to 1400 cycles.

The filter 24 is connected to a detector 40 which shall be termed the "pen lifter" detector. This detector transforms into a direct voltage the alternating current signal from the oscillator 14 which is passed by the filter 24. The detector 40 is coupled to a pen lifter solenoid 42 and energizes the solenoid whenever the stylus 18 is lifted from the tablet 20.

The operation of the system of Fig. 1, briefly, is as follows. The pen at the receiving station is depressed on its inscribing surface only when the stylus 18 at the transmitting station is pressed into a writing position on the tablet 20. This, as previously discussed, is because when the stylus 18 is moved down on the tablet, it opens a switch and this shifts the frequency of the oscillator 14 to a value which is not accepted by the filter 24 at the receiver. Therefore, the pen lifter solenoid 42 is no longer energized by a current from the pen lifter detector 40, and the receiver pen drops to a writing position, whenever the transmitter stylus is pressed down on its tablet. Then as the stylus 18 is moved across the surface of its tablet to inscribe a message, the signals from the oscillators 10 and 12 are accordingly and correspondingly shifted in frequency. This causes the discriminators 28 and 30 at the receiving station to develop output voltages which vary in correspondence with such frequency shifts in the signals from the oscillators 10 and 12. The output voltage from the discriminator 28 is transformed to an amplified direct current in the amplifier 32 which controls the motor 36. Likewise, the output voltage from the discriminator 30 is transformed to an amplified direct current in the amplifier 34 to control the left pen motor 38. The motors 36 and 38 cause the pen at the receiving station, in a manner to be more fully described subsequently, to track the movement of the stylus 18 at the transmitting station and write on its inscribing surface.

Figure 2:
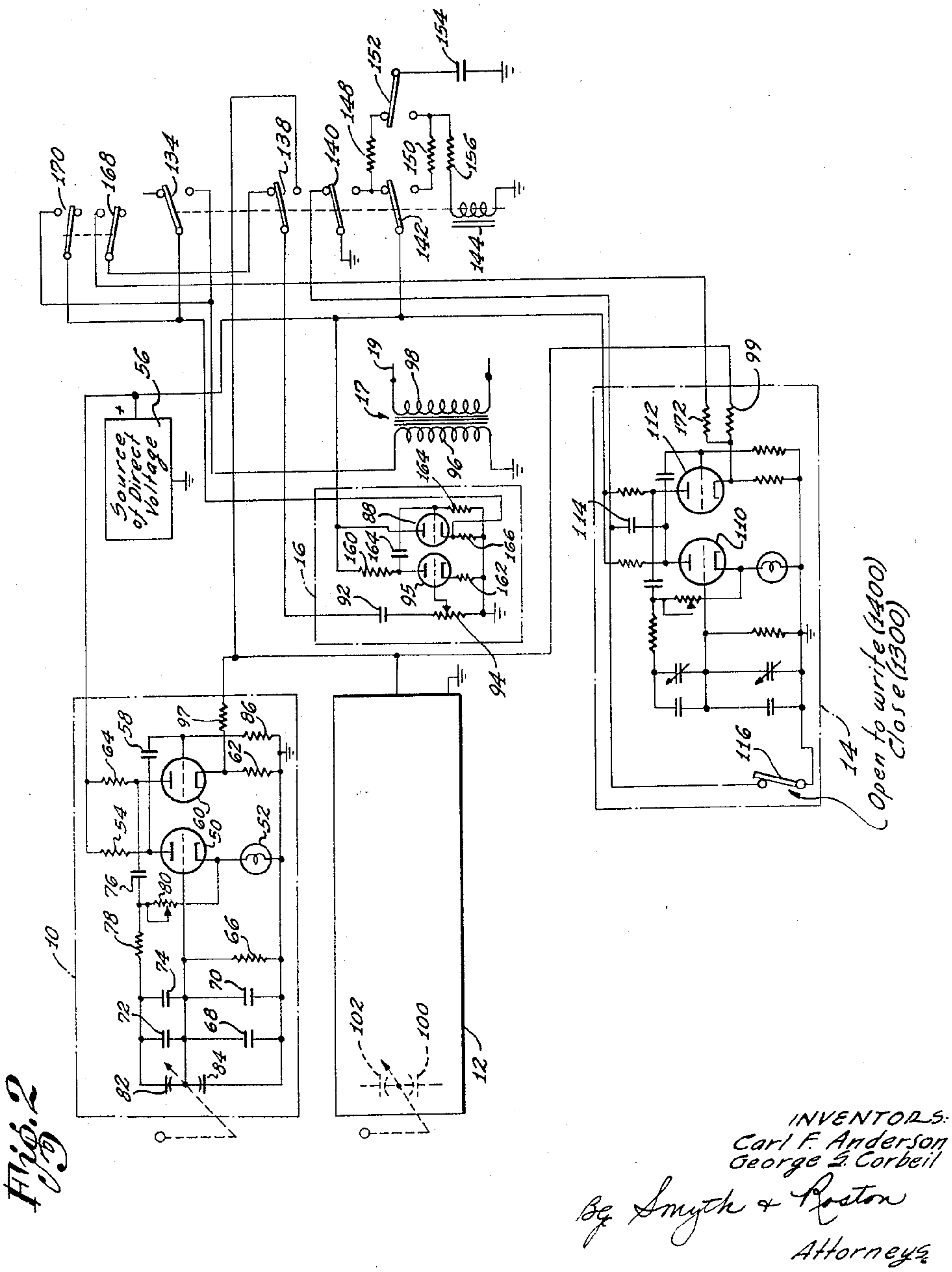
Figure 3:
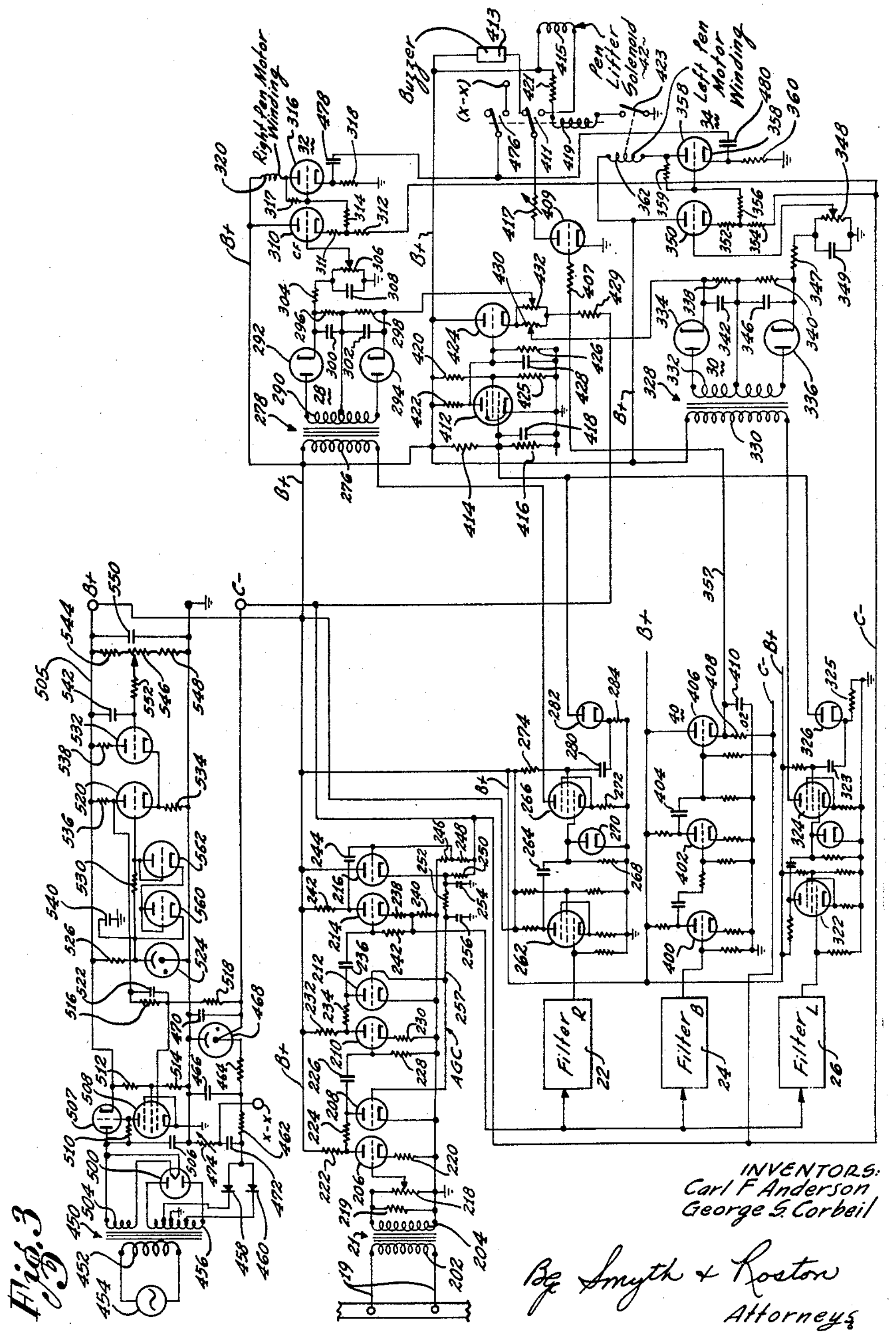
Figure 3 is a circuit diagram, partly in block form, of apparatus for receiving the transmitted frequency shifted signals and for utilizing such signals to obtain movements of a pen at a receiving station in correspondence with the movements of the stylus at the transmitting station.

Suitable circuits and systems are shown in Figures 2 and 3 for accomplishing the functions represented by the blocks shown in Figure 1. Equipment for use at the transmitting station is shown in Figure 2, and appropriate receiving apparatus is shown in Figure 3.

With reference now to Figure 2, the left line oscillator 10 is shown to be a usual two stage resistance-capacity Wien-Bridge oscillator. This oscillator includes an electron discharge tube 50 having an anode, a cathode and a control grid. The cathode of the tube 50 is connected to a light bulb 52 of usual construction which, in turn, is connected to a point of reference potential or ground. The light bulb 52 functions to maintain essentially constant voltage at the cathode of tube 52 for current variations through the tube 50.

The anode of the tube 50 is connected to one terminal of a resistor 54, and the other terminal of this resistor is connected to the positive terminal of a source of direct voltage 56. This source has a common terminal connected to ground and it also has a negative terminal. A capacitor 58 is connected between the anode of the tube 50 and the control grid of a second electron discharge tube 60. The tube 60 also has an anode and a cathode. The cathode of the tube 60 is connected to one terminal of a grounded resistor 62. The anode of the tube 60 is connected to one terminal of a resistor 64 whose other terminal is connected to the positive terminal of the direct voltage source 56. The control grid of the tube 50 is connected to one terminal of a grounded resistor 66, and this resistor is shunted by a fixed capacitor 68 and by a fixed capacitor 70. A fixed capacitor 72 and a shunting fixed capacitor 74 each have one terminal connected to the control grid of the tube 50. A capacitor 76 and a resistor 78 are series connected in the recited order between the anode of the tube 60 and the other terminal of the capacitors 72 and 74. A rheostat 80 is connected from the common junction of the capacitor 76 and the resistor 78 to the cathode of the tube 50.

The capacitor 72 is shunted by a capacitor 82 and the capacitor 68 is shunted by a capacitor 84. The capacitors 82 and 84 are connected through a suitable linkage (not shown) to the stylus 18 of Figure 1 so that movement of the stylus along the left diagonal of the tablet 20 varies the capacitive value of these two capacitors between a maximum and a minimum. The control grid of the tube 60 is connected to a grounded resistor 86.

The right line oscillator 12 of Figure 1 may also be a resistor-capacitance Wien-Bridge type of oscillator, and it may be similar in its construction and circuit connections to the oscillator 10. The oscillator 12 is shown only in block form in Figure 2, because a detailed representation of its component parts and circuits would be a mere duplication of the oscillator 10. The oscillator 12 includes a pair of variable capacitors 100 and 102 (corresponding to the capacitors 82 and 84 of the oscillator 10), and the capacitance of the capacitors 100 and 102 is controlled between the maximum and minimum limits by the movement of the stylus 18 along the right diagonal of the tablet 20. The stylus 18 may be coupled to the capacitors 82, 84 and 100, 102 through appropriate linkages, such as those described in Patent 2,355,087 to Lauder et al. Of course, the parameters of the oscillator 12, are different from those of the oscillator 10, so that each oscillator produces its own distinctive center frequency.

The circuit of the pen lifter oscillator 14 may also be similar to that of the oscillator 10. The oscillator 14 includes a pair of electron discharge tubes 110 and 112 connected as a resistance-capacity Wien-Bridge oscillator. However, the oscillator 12, instead of incorporating variable capacitors such as the capacitors 82 and 84 of the oscillator 10, includes a capacitor 114. This capacitor is connected between the anode of the tube 110 and a contact of a single-pole-single-throw switch. The switch 116 has a movable arm connected to ground, and this arm is normally spring biased into engagement with the switch contact. The switch 116 is the one referred to previously as being mounted under the tablet 20 and which is opened whenever the stylus 18 is pressed down on the tablet.

The system also includes a bank of single-pole-double-throw switches 134, 138, 140 and 142. These switches each have a movable arm and each have upper and lower contacts. The movable arms of the switches are normally spring biased into engagements with their respective upper contacts, and the arms are moved into engagements with their lower contacts when a solenoid winding 144 is energized.

The upper contact of the switch 134 is open circuited. The lower contact of this switch is connected to one terminal of the primary winding 96 of the impedance matching transformer 17. The other terminal of the primary winding is connected to ground. The transformer has a secondary winding 98. The secondary is adapted to be connected to the transmission line 19. The movable arm of the switch 134 is connected to the cathode of an output tube 88 whose circuit will be described.

The upper contact of the switch 138 is connected to the movable arm of a switch 168 whose function and additional connections will be described. The movable arm of the switch 138 is coupled by a capacitor 92 to one terminal of a potentiometer 94. The other terminal of the potentiometer is grounded. The movable arm of the potentiometer is connected to the control grid of a tube 95. This tube is connected as a mixer, as will be described. The lower contact of the switch 138 is connected to one terminal of a resistor 97 connected to the cathode of the tube 60 in the oscillator 10. This lower contact is also connected to the equivalent tube in the oscillator 12 through a resistance corresponding to the resistance 97. The lower contact is also connected to a resistor 99, which is in turn connected to the cathode of the tube 112 of the pen lifter oscillator 14.

The upper contact of the switch 140 is connected to the junction of the capacitor 114 and the fixed contact of the switch 116. The lower contact of the switch 140 is connected to the upper contact of the switch 142, and these contacts are connected to one terminal of a resistor 148. The movable arm of the switch 140 is grounded, and the movable arm of the switch 142 is connected to the positive terminal of the source of direct voltage 56. The lower contact of the switch 142 is connected to one terminal of a resistor 150.

The system also includes a single-pole-double-throw switch 152 having a movable arm and upper and lower contacts. The movable arm of the switch 152 is normally spring biased into contact with the upper contact of the switch, and the arm is adapted to be depressed by the stylus 18 of Figure 1 into contact with the lower contact of the switch. The switch 152 is positioned adjacent the tablet 20, as shown in Figure 1, so that the stylus 18 must be moved to a predetermined location away from its tablet 20 before it can actuate the switch. The upper contact of the switch 152 is connected to the other terminal of the resistor 148, and the lower contact of the switch is connected to the other terminal of the resistor 150. A capacitor 154 is connected between the movable arm of the switch and ground. A resistor 156 is connected between the lower contact of the switch 152 and one terminal of the solenoid winding 144. The other terminal of the winding 144 is connected to ground.

The anode of the tube 95 is connected to a load resistor 160 connected to the positive terminal of the source 56. The cathode of the tube 95 is connected to a grounded degenerative resistor 162. A coupling capacitor 164 couples the anode of the tube 95 to the grid of the tube 88.

The tube 88 is connected as a cathode follower. Its anode is connected directly to the positive terminal of the source 56. The grid of the tube is connected to ground by a resistor 164, and a resistor 166 is connected between the cathode of this tube and ground. As previously noted, the movable arm of the switch 134 is connected to this cathode.

The transmitter of Figure 1 also includes a pair of mechanically coupled, single-pole-double-throw push-button switches 168, 170. The movable arms of these switches are normally spring biased to their illustrated position in engagement with the lower contact of the switches. The upper contact of the switch 170 is connected to the ungrounded terminal of the primary winding 96 of the output transformer 17. The movable arm of the switch 170 is connected to the movable arm of the switch 134. The lower contact of the switch 170 is open. The upper contact of the switch 168 is connected to a resistor 172 which is connected to the cathode of the tube 112 of the pen lifter oscillator 14. The movable arm of the switch 168, as previously noted, is connected to the upper contact of the switch 138. The lower contact of the switch 168 is open.

As mentioned previously in this description, the oscillator 10 is connected as a usual Wien-Bridge resistance-capacity oscillator. Signals translated by the tube 50 are introduced to control grid of the tube 60. The signals are amplified in the tube 60 and appear with inverted phase at its anode. The amplified signals are then fed back to the control grid of the tube 50 through a feed back network including the elements 72, 74, 76, and 78. The signals then appear across the network including the elements 66, 70 and 68 for application to the control grid of the tube 50. As is well known to the art, the phase shifting characteristics of the illustrated resistance-capacity network are dependent upon frequency, and oscillation is sustained in the oscillator at one particular frequency only, as determined by the parameters of the networks referred to above. As is also well known, the variation of the capacity or resistance of the networks changes the frequency at which oscillation is sustained. In the illustrated circuit, the stylus-actuated capacitors 82 and 84 vary in capacity as the stylus 18 is moved across the tablet 20, and these capacitors produce a corresponding variation in the frequency of the oscillator. As noted previously, the oscillator 10 may, for example, have a center frequency of 2300 cycles, and this frequency may be varied by ±30 cycles by the movement of the stylus from the center of the tablet up and down its left diagonal. The center frequency of the oscillator can be controlled and set by manually adjusting an appropriate manual vernier adjustment (not shown) in the stylus linkage. The network also includes a degenerative rheostat 80 which feeds a portion of the feed-back signal to the cathode, and this rheostat is adjusted to an appropriate setting which holds the drive of the tube 50 within permissible limits.

The output signal from the oscillator 10 appears across the cathode resistor 62, and this signal is fed through the switch 138 and coupling capacitor 92 to the potentiometer 94 in the input circuit of the tube 95. The circuit of the tube 95 and the output tube 88 constitute the linear mixer 16 of Figure 1. The tube 88 is connected as a cathode follower, and its cathode is connected through the switch 134 to the primary winding 96 of the transformer 17.

In a constructed embodiment of the invention, the following values were used for the elements of the oscillator 10. These constants produce a center frequency of essentially 2300 cycles. The constants are listed in this specification merely by way of example, and should not be construed as limiting the invention in any way.

| | | |
|---|---|---|
| Resistor **54** | kilo ohms | 68 |
| Resistor **62** | ohms | 680 |
| Resistor **64** | kilo ohms | 22 |
| Resistor **66** | do | 56 |
| Resistor **78** | do | 56 |
| Resistor **86** | megohms | 1 |
| Tubes **50** and **60** | | 12AU7 |
| Rheostat **80** | | 5K |
| Capacitor **68** | microfarads | 680 |
| Capacitor **70** | do | 470 |
| Capacitor **72** | do | 680 |
| Capacitor **74** | do | 470 |
| Capacitor **82** | do | 7–40 |

The oscillator 12 may be constructed, as previously mentioned, in a manner similar to that of oscillator 10. However, as was pointed out, the parameters of the circuit of the latter oscillator must be different from those of the oscillator 10, so that the center frequency of the output signal of the oscillator 12 may be frequency displaced from the center frequency of the output signal of the oscillator 10. As noted previously, the oscillator 12, may, for example, have a center frequency of 1700 cycles, and this frequency is shifted by the action of the stylus 18 varying the capacitors 100 and 102 by, for example 30 cycles.

The output signal of the oscillator 12 is also introduced through the switch 138 and capacitor 92, and via the potentiometer 94, on the control grid of the mixer tube 95. The signal then appears across the cathode resistor 166 of the output tube 88 for application through the switch 134 to the primary winding 96 of the transformer 17. The transformer then introduces the latter signal to the transmission line 19.

The output signal from the oscillator 14 like the signals from the oscillators 10 and 12, is introduced to the input circuit of the mixer tube 95 through the switch 138. The mixer tube 95 is operated on the linear portion of its characteristic curve, so that there will be no tendency for the signals from the oscillators to heterodyne with one another and produce unwanted harmonics.

The oscillator 14 may, for example, have a frequency of 1400 cycles when the switch 116 is open, and when the switch 140 is in its illustrated position. However, whenever either of these switches is closed, the capacitor 114 is connected between the anode of the tube 110 and ground. The additional capacity reflected into the oscillator circuit by this capacitor reduces the oscillating frequency by a predetermined amount which, for example, may be of the order of 100 cycles. In the manner described, the receiving station selects only the lower frequency of the oscillator 14. That is, whenever the stylus 18 is raised and the switch 116 is closed, the resulting lower frequency output signal of the oscillator 14 is selected at the receiver. This lower frequency output signal is used, in a manner to be fully described, to operate either a signaling buzzer at the termination of a message or to operate a pen lifter solenoid as mentioned previously. On the other hand, whenever the stylus 18 is depressed on the tablet 20 and the switch 116 is opened the signal from the oscillator 14 is changed in frequency and is no longer accepted by the receiver.

When the switches 134, 138, 140 and 142 are in their illustrated position, and even though the oscillators 10, 12 and 14 are energized, no signal is impressed on the primary winding 96 of the transformer 17 for transmission over the line 19. This condition obtains because the movable arm of switch 138 (which is connected to the input of the mixer tube 95) is for the illustrated condition out of engagement with its lower contact on which the output signals from the oscillators 10, 12 and 14 are introduced. Therefore, no signal is impressed on the tubes 95 and 88 of the mixer 16. Also in the illustrated position the arm of the switch 134 is out of engagement with its lower contact, and the mixer is, therefore, disconnected from the transformer 17.

However, it is possible with the switches 134, 138, 140 and 142 in their illustrated position of Figure 1, to transmit the lower frequency output signal from the oscillator 14 to the receiving stations. This may be done by manually actuating the push button switches 168 and 170. The grounded armature of the switch 140 connects the capacitor 114 of the oscillator to ground to establish the oscillator 14 at its lower frequency. So long as the switch 140 is in its illustrated position, and regardless of the condition to which the switch 116 may inadvertently be placed, the oscillator 14 is held at its lower frequency. It will be remembered that this lower frequency is the one selected by the receiving stations. Actuation of the push button switch 168 introduces the output signal from the oscillator 14 (which appears at its upper contact) through the switch 138 to the input circuit of the mixer tube 95. The concurrent actuation of the switch 170 supplies the output signal at the cathode of the tube 88 to the primary winding 96 of the output transformer 17. The signal from the oscillator 14 is, therefore, introduced to the line 19. In a manner to be described, this actuation of the push button switches 168, 170 while the switches 134, 138, 140 and 142 are in their illustrated position of Figure 1, is used to energize a signaling buzzer at the receiver. This buzzer may, for example, be energized at the completion of a message. This will draw the operator's attention at the various receiving stations to the fact that a message has been received and recorded.

To condition the system for transmission of the signals over the line 19, the stylus 18 of Figure 1 is moved to the position of the switch 152, and the movable arm of the switch is moved against its spring bias from its upper to its lower contacts by the tip of the stylus. This causes the arm to connect the capacitor 154 and the resistor 156 across the solenoid winding 144. The capacitor at this time is in a fully charged condition, it having previously obtained its charge from the positive terminal of source 56 through the switch 142 and the resistor 148. The capacitor 154 now discharges through the solenoid winding 144. This energizes the winding and causes it to move the arms of the switches 134, 138, 140 and 142 into engagement with their lower contacts. The engagement of the arm of the switch 142 with its lower contact establishes a holding circuit for the solenoid winding from the positive terminal of the source 56 and through the resistors 150 and 156. Therefore, the arm of the switch 152 can be returned to its upper position, by the removal of the tip of the stylus 18, without affecting the energized condition of the solenoid winding.

The movable arm of the switch 134 now engages its lower contact to connect the cathode of the output tube 88 to the primary winding 96 of the output transformer 17. The movable arm of the switch 138 engages its lower contact to connect the outputs of the oscillators 10, 12 and 14 to the input circuit of the mixer tube 95. The grounded movable arm of the switch 140 disengages its upper contact to remove the fixed ground from the capacitor 114, and this allows the frequency of the oscillator 14 to come under the control of the under platen switch 116.

The system is now in condition for normal operation, and movement of the stylus 18 produces corresponding shifts in the frequency of the output signals of the oscillators 10 and 12, and these signals are introduced to the line 19 for transmission to the receiving stations. Also, each time the stylus 18 at the transmitter is lifted from the tablet 20, the switch 116 of the oscillator 14 closes to shift the frequency of the oscillator 14 and causes a signal to be sent to the receiving stations of the proper frequency to be selected at the receiving stations. The selected signal is used to actuate a solenoid and lift the pens at the receiving stations.

The circuit diagram of Figure 3, as previously mentioned, constitutes a system for use at a typical receiving station. The system includes the impedance matching transformer 21 described in conjunction with Figure 1. This transformer has a primary winding 202 connected to the transmission line 19. The transformer also has a secondary winding 204.

One terminal of the secondary winding 204 is grounded. The secondary is shunted by a potentiometer 213 the movable arm of which is connected to the control grid of an electron discharge tube 206. The potentiometer 218 is shunted by a resistor 219 for impedance matching purposes. The tube 206, together with additional tubes 208, 210, 212, 214 and 216 are connected to form a preamplifier circuit for the three signals from the transmitter as received over the line 19. The control grid of the tube 206 is connected to a grounded resistor 218, and the cathode of this tube is connected to the potentiometer 220. The anode of the tube is connected to a resistor 222, and this resistor in turn is connected to the positive output terminal B+ of a power supply which will be described.

The cathode of the tube 208 is connected to ground, and the anode of this tube is connected to one terminal of a resistor 224. The other terminal of the resistor 224 is connected to the anode of the tube 210. A capacitor 226 is connected between the anode of the tube 208 and the control grid of the tube 210. The control grid of the latter tube is connected to a grounded resistor 228, and the cathode of that tube is connected to a grounded resistor 230. The anode of the tube 210 is connected to a resistor 232, which, in turn, is connected to the positive terminal B+. The cathode of the tube 212 is connected to ground, and the anode of this tube is connected to a resistor 234. The resistor 234 is connected to the anode of the tube 210. The control grids of the tubes 208 and 212 are connected to a lead 257 labelled "AGC."

A capacitor 236 is coupled between the anode of the tube 212 and the control grid of the tube 214. A pair of series connected resistors 238 and 240 are connected between the cathode of the tube 214 and ground. A resistor 242 is connected between the control grid of the tube 214 and the common junction of the resistors 238 and 240. The anode of the tube 214 is connected to a resistor 242, and this resistor is connected to the positive terminal B+.

A capacitor 244 is connected between the anode of the tube 214 and the control grid of the tube 216. The tube 216 is connected as a cathode follower detector and has its anode connected to the positive terminal B+. A pair of resistors 246 and 248 are connected in series between the negative terminal C− of the power supply and ground to form the voltage divider. The control grid of the tube 216 is connected to a common junction of the resistors 246 and 248. A resistor 250 is connected between the cathode of the tube 216 and the negative terminal C−. The cathode of the tube 216 is connected to one terminal of a resistor 252 and the other terminal of this resistor is connected to the control grids of the tubes 208 and 212. A capacitor 254 is connected between one terminal of the resistor 252 and ground, and a capacitor 256 is connected between the other terminal of this resistor and ground.

The preamplifier formed by the tubes 206, 208, 210, 212, 214 and 216 is designed to have compressor-expander characteristics. This is most desirable since it is essential that the signals utilized by the receiving system have essentially constant amplitudes over relatively long periods of time. To accomplish this, the preamplifier includes an automatic gain control circuit. It is most essential that the preamplifier be extremely linear throughout the range of its controlled gain to prevent interaction between the signals and the production of unwanted harmonics. Therefore, it is necessary for the automatic gain control circuit to control the gain of the amplifier without affecting its linear characteristics.

In the disclosed amplifier circuit, the tubes 208 and 212 function as variable resistances across the tubes 206 and 210. It can be seen that the signal introduced to the tube 210 from the tube 206 has an amplitude dependent upon the internal resistance of the tube 208, because the tube 208 and the resistor 224 form a voltage divider for the signals from the tube 206. Likewise, the tube 212 and the resistor 234 form a voltage divider for the signals from the tube 210. Therefore, the effective gain of the preamplifier can be controlled by controlling the internal resistance of the tubes 208 and 212. Also, as long as the tubes 208 and 212 are controlled within their linear range, such variations of their internal resistance will have no distorting effect on the signals.

Then, for a linear preamplifier with automatic gain control, it is only necessary for the tubes 206, 210 and 214 to be operated by the signals over the linear portion of their characteristics.

The tube 216, as noted above, is connected as a cathode follower detector. The control grid of the tube 216 is returned to the negative terminal C— of the power source. Therefore, the tube 216 conducts only on the positive half cycles of the signals impressed on its control grid and a rectified signal appears across its cathode resistor 250. This rectified signal is filtered in the filter formed by the resistor 252 and the capacitors 254 and 256. A direct voltage appears, therefore, on the automatic gain control (AGC) lead 257. This AGC voltage is on a negative axis with respect to ground, since the cathode of the tube 216 is returned to the negative terminal C—. Also, the AGC voltage approaches zero as signal level increases, and it becomes more negative as the signal level decreases. Therefore, upon an increase in signal level, the voltage on the AGC lead 257 becomes less negative to increase the conductivity of the tubes 208 and 212 and to decrease the internal resistance of these tubes. This produces a resulting attenuation to the signal translated by the preamplifier, due to the action of the voltage dividers formed by these tubes and the respective resistors 224, 234. Similarly, should the signal level tend to decrease, the voltage on the AGC lead 257 becomes more negative and this increases the internal resistance of the tubes 208 and 212 thereby to decrease the attenuation of the signal level. The preamplifier is controlled, therefore, to oppose any tendency for the signals translated through it to increase or decrease in amplitude.

In a constructed embodiment of the preamplifier the following constants were used:

| | | |
|---|---|---|
| B+ | volts | +250 |
| C— | do | —150 |
| Resistor 218 | kiloohms | 0–200 |
| Resistor 219 | do | [1] 82 |
| Resistor 220 | do | 1.5 |
| Resistor 222 | do | 15 |
| Resistor 224 | do | 150 |
| Capacitor 226 | microfarads | .001 |
| Tubes 206, 208 | | 12AU7 |
| Resistor 228 | kiloohms | 470 |
| Resistor 230 | do | 1.5 |
| Resistor 232 | do | 27 |
| Resistor 234 | do | 200 |
| Capacitor 236 | microfarads | .001 |
| Tubes 210, 212 | | 12AU7 |
| Resistor 242 | kiloohms | 470 |
| Resistor 238 | ohms | 470 |
| Resistor 240 | kiloohms | 2.2 |
| Resistor 246 | do | 470 |
| Resistor 248 | megohms | 2.2 |
| Resistor 250 | do | 1 |
| Capacitor 244 | microfarads | .001 |
| Tubes 214, 216 | | 12AT7 |
| Capacitor 254 | microfarads | .1 |
| Resistor 252 | megohms | 1 |
| Capacitor 256 | microfarads | .1 |

[1] For 600 ohms input impedance.

The output from the preamplifier is taken from the common junction of the resistors 238 and 240 in the cathode circuit of the tube 214, and these signals are impressed on the filters 22, 24 and 26. These filters were described in conjunction with Figure 1, and it will be remembered that the filter 22 selects the signal from the right line oscillator 12, the filter 24 selects the signal from the pen lifter oscillator 14 whenever the stylus 18 is raised, and the filter 26 selects the signal from the left line oscillator 10.

The output terminal of the filter 22 is connected to the control grid of an electron discharge tube 262. The tube 262 is preferably a pentode and is connected as a usual amplifier circuit. A coupling capacitor 264 is connected between the anode of the tube 262 and the control grid of an electron discharge tube 266. The ube 266 is also preferably a pentode, and it is connected as a self-biased amplitude limiter. The control grid of the tube 266 is connected to a grounded resistor 268. A diode 270 has its anode connected to the control grid of the tube 266 and has its cathode connected to ground. The cathode of the tube 266 is connected to a grounded resistor 272, and the screen grid of the tube is connected to a resistor 274 which, in turn, is connected to the positive terminal B+. The suppressor electrode of the tube 266 is connected to the cathode of this tube, and the anode of the tube is connected to one terminal of the primary winding 276 of a frequency discriminator transformer 278 associated with the right line frequency discriminator of Figure 1. The other terminal of this primary winding is connected to the positive terminal B+. A capacitor 280 is connected between the screen grid of the tube 266 and the cathode of a diode 282. This cathode is connected to a grounded resistor 284.

The secondary winding 290 of the frequency discriminator transformer 278 has one terminal connected to the anode of a diode 292, and its other terminal is connected to the anode of a diode 294. A pair of series resistors 296 and 298 and a pair of series capacitors 300 and 302 are connected in shunt between the cathodes of the diodes 292 and 294. The secondary winding has center tap connected to the common junction of the capacitors 300 and 302 and of the resistors 296 and 298.

The cathode of the diode 292 is also connected to a resistor 304. This resistor is connected to one of the fixed contacts of a potentiometer 306. The other fixed contact of this potentiometer is connected to ground, and the potentiometer is shunted by a capacitor 308. The movable arm of the potentiometer 306 is connected to the control grid of a tube 310. This latter tube is connected as a cathode follower, and its anode is connected to the positive terminal B+. A pair of resistors 311 and 312 are connected between the cathode of the tube 310 and the negative terminal C—. A resistor 314 is connected between the common junction of the resistors 311 and 312 and the control grid of an electron discharge tube 316. The tube 316 is connected as a direct current amplifier, and its cathode is connected to a grounded cathode resistor 318. A negative feed back resistor 317 is connected between the anode and grid of this tube. The anode of the tube 316 is connected to one terminal of the winding 320 of the right pen motor 36. The motor drives the receiver pen through a linkage which will be described in conjunction with Figure 4.

The filter 26 is coupled to an amplifier including an electron discharge tube 322 which, like the tube 262, is connected as an amplifier. The tube 322 is coupled to a tube 324. The tube 324, like the tube 266, is connected as a self-biasing amplitude limiter. The circuit of the tube 324, is essentially similar to that of the tube 266, and the screen grid of the tube 324 is, in like manner, coupled to a capacitor 323 which is connected to the cathode of a diode 326. The cathode of the diode 326 is connected to a resistor 325 whose other terminal is connected to ground.

The anode of the tube 324 is connected to one terminal of the primary winding 330 of a frequency discriminator transformer 328, the other terminal of this winding being connected to the positive terminal B+. This transformer is associated with the left line frequency discriminator 30 of Figure 1. The secondary winding 332 of the transformer 328 has one terminal connected to the anode of a diode 334 and its other terminal is connected to the anode of a diode 336. A pair of series resistors 338 and 340 and a pair of series capacitors 342 and 346 are connected in shunt between the cathodes of the diodes 334 and 336. The secondary winding 332 has a center tap which is connected to the common junction of the capacitors 342 and 346 and to the common junction of the resistors 338 and 340.

The cathode of the diode 336 is connected to one terminal of a resistor 347, and the other terminal of this resistor is connected to one of the fixed contacts of a potentiometer 348. The other fixed contact of this potentiometer is connected to ground, and the potentiometer is shunted by a capacitor 349. The movable arm of the potentiometer 348 is connected to the control grid of a tube 350. The tube 350, like the tube 310, is connected as a cathode follower. A pair of series resistors 352 and 354 are connected between the cathode of the tube 350 and the negative terminal C—. The anode of the tube is connected to the positive terminal B+.

A resistor 356 is connected from the common junction of the resistors 352 and 354 to the control grid of a tube 358. The tube 358, like the tube 316, is connected as a direct current amplifier. A negative feed back resistor 359 is connected between the anode and grid of this tube. The cathode of the tube 358 is connected to one terminal of a grounded resistor 360, and the anode of this tube is connected to one terminal of the winding 362 of the left pen motor 38 of Figure 1. The other terminal of the motor winding 362 is connected to the positive terminal B+.

The motors 36 and 38 are linked to a pen 380 (Figure 4) through appropriate linkages and in a manner similar to that described in Patent 2,355,087 referred to above. That is, the left pen motor 38 is linked with the pen 380 through linkages 382 and 384, and the right pen motor 36 is linked to the pen through linkages 386 and 388. The motors 36, 38 cause the pen 380 to be moved over a writing table 390 to duplicate the written message from the transmitting station and write the message on that tablet.

The filter 24 (Figure 3) is connected to the control grid of a vacuum tube 400. This tube and a further vacuum tube 402 are connected in cascade and as a usual two-stage resistance-coupled amplifier. A capacitor 404 is connected between the anode of the tube 402 and the control grid of a vacuum tube 406. The tube 406 is connected as a cathode follower detector and constitutes the pen lifter detector 40 of Figure 1. The cathode of the tube 406 is connected to one terminal of a resistor 408 and the other terminal of this resistor is connected to the negative terminal C—. A capacitor 410 is connected between the cathode of the tube 406 and ground. The anode of the tube 406 is connected to the positive terminal B+.

A resistor 407 is connected between the cathode of the tube 406 and the control grid of an electron discharge tube 409. The cathode of the tube 409 is connected to ground and the anode of this tube is connected through a rheostat 417 to the movable arm of a single-pole-double-throw switch 411. The switch 411 is normally spring biased to its illustrated position in which its movable arm engages the upper contact of the switch. The upper contact is connected to one terminal of a buzzer 413 for other suitable signal received. The other terminal of this buzzer is connected to the positive terminal B+. The lower contact of the switch 411 is connected to one terminal of the control winding 415 of the pen lifter solenoid 42 of Figure 1. The details of this will be described. The switch 441 is controlled by a winding 419. A resistor 421 is connected between one terminal of the winding 419 and the positive terminal B+. The other terminal of the winding 419 is connected to the fixed contact of a switch 423. The switch 423 has a movable arm connected to ground, and this movable arm is disposed in the magnetic field of the motor winding 362 to be closed whenever the winding 362 is energized.

The anode of the diode 282 and the anode of the diode 326 are connected to the control grid of an electron discharge tube 412 which is preferably a pentode. This control grid is connected to the common junction of a pair of resistors 414, 416 connected as a voltage divider between the positive terminal B+ and ground. The lower resistor 416 is shunted by a capacitor 418. The cathode of the tube 412 is connected to ground, as is the suppressor grid of this tube. A pair of resistors 420 and 425' are connected in series between the positive terminal B+ and ground to form a voltage divider, and the screen grid of the tube 412 is connected to the common junction of these resistors.

The anode of the tube 412 is connected to a resistor 422 which is connected to the positive terminal B+. This anode is further connected to the control grid of an electron discharge tube 424. The tube 424 is connected as a cathode follower. A resistor 426 and a shunting capacitor 428 are connected between its control grid and ground. The anode of the tube 424 is connected to the positive terminal B+. A resistor 429 has one terminal connected to the negative biasing source C—. A potentiometer 430 is connected between the cathode of the tube 424 and the other terminal of the resistor 429. A second potentiometer 432 is also connected between the cathode of the tube 424 and the other terminal of the resistor 429. The movable arm of the potentiometer 430 is connected to the cathode of the diode 334, and the movable arm of the potentiometer 432 is connected to the cathode of the diode 294.

In a constructed embodiment of the invention, the following constants were used and these are listed merely by way of example:

| | | |
|---|---|---|
| Resistor **414** | megohms | 2.7 |
| Resistor **416** | do | 2.2 |
| Capacitor **418** | microfarads | .01 |
| Resistor **420** | kilo ohms | 47 |
| Resistor **425** | do | 15 |
| Resistor **422** | megohms | 1 |
| Resistor **426** | do | 1 |
| Capacitor **428** | microfarads | 1 |
| Potentiometer **430** | kilo ohms | 50 |
| Potentiometer **432** | do | 50 |
| Tubes **412**, **424** | | 6AN8 |

The system also includes a highly stabilized power supply for rectifying the alternating current from the usual mains and for introducing positive direct voltage to the terminal B+ and the negative direct voltage to the terminal C—. The power supply includes a usual power transformer 450, and the transformer has a primary winding 452 conencted to a usual alternating current source 454. The transformer also has a secondary winding 456 which has a grounded center tap. The secondary winding also has a pair of intermediate taps between the center tap and the terminals of the winding. These intermediate taps are respectively connected to the cathodes of a pair of rectifying devices 458 and 460 which may be conventional selenium rectifiers. The anodes of the rectifiers 458 and 460 are connected together. A pair of series resistors 462 and 464 are connected between these anodes and the terminal C—. A capacitor 466 is connected between the common junction of the resistors 462 and 464 and ground, and a votlage regulator tube 468 is connected between the other terminal of the resistor 464 and ground, this tube being shunted by a capacitor 470. The elements 462, 464, 466, 468 and 470 provide filtering and voltage stabilizing, and a stabilized and filtered negative voltage appears at the terminal C—. This voltage may, for example, be 150 volts. The connection of this negative voltage portion of the power supply symmetrically about the center tap of the secondary winding 456 enables varying loads to be taken from this portion without distorting the voltage wave form across the secondary winding. A series connected capacitor 472 and variable resistor 474 are connected in series between the anodes of the diodes 458, 460 and ground. The common junction of the capacitor 472 and the resistor 474 is connected to the lower contact of a switch 476 which, like the switch 411, is under the control of the solenoid winding 419. The connection from the capacitor 472 and the resistor 474 to the switch 476 is not shown in Figure 3 but is indicated by common terminals designated as "X—X." The upper contact of the switch 476 is not connected in the circuit. A capacitor 478 couples the movable arm of the switch 476 to the cathode of the tube 316, and a capacitor 480 couples the movable arm of the switch 476 to the cathode of the tube 358.

A full wave rectifier tube 500 has its anodes connected to the respective terminals of the secondary winding 456 of the power transformer 450. The transformer 450 has a filament winding 504 which is connected to the filament of the tube 500. One terminal of the filament winding is also connected to the anode of an electron discharge tube 505, and a capacitor 506 is connected between this anode and ground. A lead 505 connects the cathode of the tube 504 to the positive terminal B+. A vacuum tube 508 has its anode connected to the control grid of the tube 504, and a resistor 510 connects this anode to the anode of the tube 504. The tube 508 is preferably a pentode, and its cathode is connected to ground. The screen grid of the tube 508 is connected to the common junction of a pair of resistors 512 and 514, and these resistors are connected in series between the cathode of the tube 504 and ground. The suppressor electrode of the tube 508 is connected to its cathode. The control grid is connected to the junction of a pair of series resistors 516, 518. The resistor 518 is connected to the C— terminal and the resistor 516 is connected to the anode of an electron discharge tube 520. A capacitor 522 is connected in shunt with the resistor 516.

A voltage regulator 524 is connected in series with a resistor 526 between the lead 505 and ground. A resistor 530 is connected from the junction of the voltage regulator 524 and the resistor 526 to the control grid of the tube 520. The tube 520 and a second tube 532 are connected as a differential amplifier, and the cathodes of these tubes are connected to a common grounded resistor 534. The anode of the tube 520 is connected to a resistor 536, and the anode of the tube 532 is connected to a resistor 538. The resistors 536 and 538 are connected to the B+ lead 505. A capacitor 540 is connected between the junction of the resistors 526, 530 and ground; and a capacitor 542 is connected between the control grid of the tube 532 and the B+ lead 505.

A voltage divider made up of three series resistors 544, 546, and 548 is connected between the lead 505 and ground, and this voltage divider is shunted by a capacitor 550. The resistor 546 has a movable arm, and a resistor 552 is connected between the control grid of the tube 532 and this movable arm.

The direct-current amplifier tube 316 and the direct-current amplifier tube 358 may be of the same type. For example, each of these tubes may comprise both sections of a 6BL7 connected in parallel. Two additional tubes 560 and 562, of the same type as the tubes 320 and 358, are connected in series, and as diodes, across the resistor 530. That is, the cathode of the tube 560 is connected to one side of the resistor 530, the anode of this tube is connected to the cathode of the tube 562; the anode of the tube 562 is connected to the other side of the resistor 530, and the control grids of the tubes are connected to their respective anodes.

The system of Figure 3 operates in the following manner:

The amplified signals from the tube 214 in the final stage of the preamplifier are introduced to the filters 22, 24 and 26. The filter 22 selects the frequency shifted signal from the right line oscillator 12, and this signal is amplified in the amplifier circuit of the tube 262. The amplified signal is impressed on the control grid of the tube 266. This latter tube, as previously noted, is connected as a self-biased amplitude limiter. That is, the positive peaks of the amplified signal from the tube 262 tend to produce grid current flow in the tube 266 and corresponding current flow through the diode 270. This current flow produces a negative voltage across the resistor 268 and which persists due to the charge in the capacitor 264. The net result is that the control grid of the tube 266 is biased negatively by the signal from the tube 262 and by an amount determined by the amplitude of the signal. The negative bias is such that the negative peaks of the signal drive the tube to cut off and are amplitude limited, whereas the positive peaks of the signal are clamped and amplitude limited by the diode 270 and grid of the tube 266. Therefore, any relatively rapid changes in the amplitude of the signal from the tube 262 due to noise and the like, produce current flow in the diode 270 for the positive peaks and drive the tube 266 to cut off for the negative peaks. These changes, therefore, have no appreciable effect on the plate current of the tube 266.

An amplified, amplitude-limited, frequency-shifted signal current is passed, therefore, through the primary winding of the frequency discriminator transformer 278. The frequency discriminator circuit 28 of the diodes 292 and 294 operates in known manner to convert the frequency changes of the signal current in the primary winding into voltage changes in its output circuit. Frequency discriminator circuits of this type exhibit linear characteristics through a relatively wide range when they are operated through their zero output voltage point. That is, for wide range linear operation, the discriminator should be designed so that for the center signal frequency of, for example, 2300 cycles, zero voltage is normally developed across the resistors 296 and 298. Then, for an increase in frequency, a linearly related increasing voltage is developed across the resistors 296, 298 in a positive sense. For a decrease in frequency, on the other hand, a linearly related negative voltage is increasingly developed across the resistors 296, 298. In this manner, the frequency discriminator develops a voltage which increases with a linear relation on either side of zero for shifts in frequency of the signal current above and below the center frequency of, for example, 2300 cycles.

In much the same manner, the 1700 cycle left line signal from the filter 26 is amplified in the amplifier 322. The signal is then amplitude limited in the self-biased limiter circuit of the tube 324, and it is then introduced to the frequency discriminator 30 of the diodes 334 and 336. This latter frequency discriminator, like the discriminator 28, is preferably constructed so that, in normal operation, it develops an output voltage across the resistors 338, 340 which increases linearly in a positive or negative direction on each side of zero as the signal from the filter 26 is shifted above or below its center frequency of, for example, 1700 cycles.

For precise and accurate control of the receiver pens, it is desirable that the discriminators 28 and 30 be operated through their zero voltage points for wide range linear response. Yet, for smooth and jerk-free operation of the receiver pens, it is essential that the output voltages from the discriminators increase from zero in a unidirectional preferably positive sense, instead of being bidirectional. The reasons for this have been discussed. This is achieved by the control circuit of the tubes 412, 424 and which will now be described.

Whenever the signal from the right line oscillator 12 is received at the receiving station and passed by the filter 22, and when this signal is amplified in the amplifier circuit of the tube 262 and amplitude limited in the circuit of the tube 266, a portion of the signal also appears at the screen grid of the tube 266. This portion of the signal is introduced through the capacitor 280 to the resistor 284 and appears across that resistor 284. The signal across the resistor 284 is rectified in the diode 282, and it appears as a negative direct voltage at the grid of the tube 412. The capacitor 418 functions as a filter capacitor.

Likewise, whenever a signal from the left line oscillator 10 is received at the receiving station and passed by the filter 28, and when this latter signal is amplified in the amplifier circuit of the tube 322 and amplitude limited in the circuit of the tube 324, a portion of the latter signal appears at the screen grid of the tube 324. This portion of the signal is introduced through the capacitor 323 to the resistor 325 and appears across the resistor 325. The signal across the resistor 325 is rectified in the diode 326 and applied as a negative voltage to the grid of the tube 412.

The negative voltage from the diode 282, as introduced to the control grid of the tube 412, is developed whenever a signal is received from the right line oscillator 12 at the transmitter. Also, an additional negative voltage from the diode 326 is impressed on the control grid of the tube 412, whenever a signal is received from the left line oscillator 10 at the transmitter.

A forced positive bias is introduced to the control grid of the tube 412 by its connection to the common junction of the voltage divider resistors 414, 416. This positive bias is such that, in the absence of received signals, grid current flows in the tube 412, and the tube is highly conductive. The high conductivity of the tube 412 causes a relatively high voltage drop to be developed across the resistor 422 in its plate circuit. This places a relatively low voltage on the grid of the cathode follower tube 424, so that the tube 424 passes minimum current. This minimum current through the cathode follower tube 424 produces negative voltages across the potentiometers 430 and 432 due to their connection through the resistor 429 to the negative biasing source C—. Under these conditions, the movable arms of the potentiometers are established slightly below ground potential.

Now, should one of the signals from the oscillators 10 and 12 at the transmitter be received at the receiver station, the resulting negative voltage on the control grid of the tube 412 due to the rectifying action of the diodes 282 and 326 is insufficient to drive that control grid negative with respect to the grounded cathode of the tube. Therefore, grid current continues to flow in the tube 412, and there is no change in its plate current or in the condition of the control circuit of the tubes 412 and 424. However, when both signals from the oscillators 10 and 12 at the transmitter are received, the combined negative voltages introduced to the control grid of the tube 412 from the diodes 282 and 326 are sufficient, not only to drive that grid of the tube 412 negative with respect to the grounded cathode, but to render the tube 412 nonconductive.

The resulting rise in the potential of the anode of the tube 412 when it is driven nonconductive causes the cathode follower tube 424 to become highly conductive. This is because the control grid of the tube 424 is connected to the anode of the tube 412. This high conductivity of the cathode follower tube 424 causes its cathode to swing positive and relatively large positive voltages appear at the movable arms of the potentiometers 430 and 432. The positive potential at the movable arm of the potentiometer 432 is introduced to the lower side of the resistor 298 of the discriminator circuit 28 of diodes 292, 294. This voltage biases the discriminator and effectively shifts its operating axis so that its output voltage no longer swings about a voltage point slightly below zero, but it swings from substantially zero about a positive voltage point. This is achieved without affecting the linear properties of the discriminator. The movable arm of the potentiometer 432 may be adjusted manually to provide a desired amount of shift to the operating point of the discriminator 28. This shift may be such that when the 2300 cycle signal from the left line oscillator 10 is frequency shifted through its predetermined limits by movement of the stylus 18 at the transmitter, the resulting voltage across the resistors 296 and 298 increases from a value approximately zero to a positive value.

Likewise, the positive voltage at the movable arm of the potentiometer 430 is impressed on the discriminator 30 formed by the diodes 334, 336. The movable arm of the potentiometer 430 may be adjusted so that the frequency shifted 1700 cycle signal from the right line oscillator 12 produces a voltage across the resistors 338 and 340 that varies between substantially zero and a positive value when the frequency of that signal is shifted within its predetermined limits.

A portion of the output voltage from the discriminator 28 appears across the potentiometer 306, and is introduced to the control grid of the cathode follower tube 310. The cathode follower tube 310 is so biased that the voltage at the junction of its cathode resistors 311 and 312 is sufficiently negative to drive the direct current amplifier tube 316 to cut off when there is zero or slightly negative voltage on the grid of the tube 310 from the discriminator 28. This means that so long as the discriminator output voltage is zero or slightly negative there is no current flow through the winding 320 of the right pen motor 36. This condition coincides with minimum frequency of the signal from the right line oscillator 12. However, when this signal frequency is increased up through the center frequency of 1700 cycles, the output voltage from the discriminator becomes increasingly positive. This is reflected by a continual shift in the bias of the direct current amplifier tube 316 in a direction to increase the current flow through the tube and through the motor winding 320.

Figure 4:
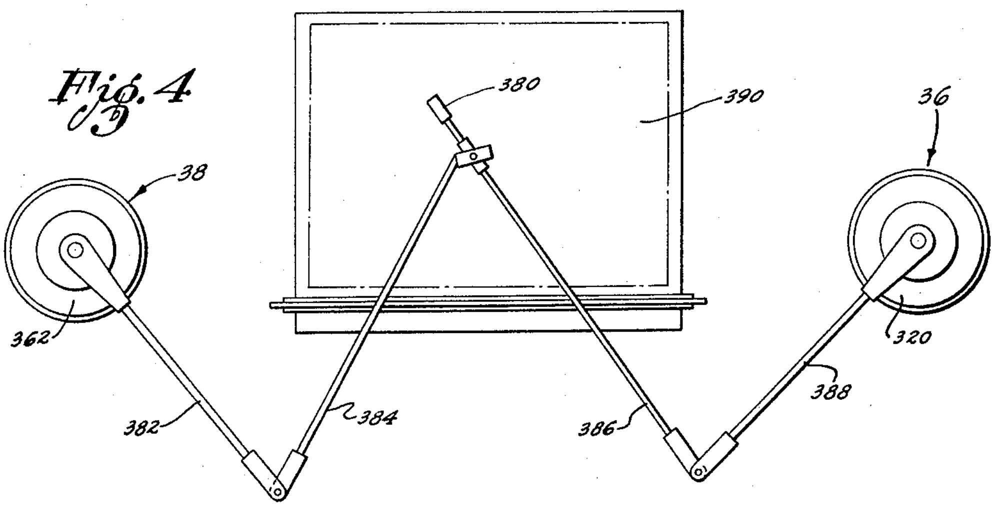
Figure 4 is a top plan view somewhat schematically illustrating the mechanical details of a linkage between the pen at the receiving station and a pair of driving motors.

The tube 316, therefore, in effect transforms the voltage output from the discriminator 28 into an amplified direct current through the winding 320 of the right motor 36 driving the pen 380 (Figure 4). In a similar manner, the cathode follower 350 controls the direct current amplifier 358. Therefore, as the frequency of the signal from the left line oscillator 10 increases from a minimum through its center frequency to a maximum, the current flow through the tube 358, and, therefore, through the winding 362 of the left pen motor increases from a minimum to a maximum. This tube 358, as previously noted, functions as a direct-current amplifier and transforms the output voltage from the discriminator 30 into an amplified current through the pen motor winding 362. Moreover, the tube 358 is controlled by the cathode follower tube 350 to pass zero current through the winding 362 when there is zero output voltage from the discriminator 30.

In making an initial adjustment for the system, it is usual to place the stylus 18 at the transmitter in a position over the switch 152. This position corresponds to that producing minimum frequency of each of the transmitted signals. At this frequency the output voltage from both discriminators 28 and 30 should be zero, so that there is zero current through the motor windings 320, 362. The potentiometers 430, 432 are then adjusted for substantially zero voltage from each of the discriminators. This moves the pen at each receiving station to a corresponding rest position away from the tablet 390. This position of rest of the receiver pen corresponds to zero current through its motor windings and zero output voltage from the discriminators. Therefore, discontinuance of the signals or deenergizing of the receiving apparatus does not change the current through the motor windings, and no sudden jerks are imposed on the pen.

The discriminators 28 and 30 need not be constructed to excessively close tolerances because of the control afforded by the potentiometers 430, 432. That is, these potentiometers can be adjusted to bring the discriminator outputs or at least the current through the pen motors, exactly to zero for the rest position, even though slight residual voltages and currents might be developed in the system.

The potentiometers 306 and 348 are adjusted so that the movement of the transmitter stylus 18 along each diagonal of the tablet 20 produces a movement of like magnitude of the pen 380 along the corresponding diagonals of the tablet 390. This latter control adjusts the size of the inscriptions by the receiver pen so that they correspond in size with the inscriptions made at the transmitter. There is some interrelation between the potentiometers 306 and 348 and the potentiometers 430 and 432. However, the required control adjustments by these potentiometers can be made without too much difficulty.

It is usual in present day practices for the alternating current mains to have a frequency of, for example, 60 cycles. Such a frequency produces a unidirectional signal with a frequency-doubled ripple of 120 cycles across the variable resistor 474 connected with the capacitor 472 between the anodes of the rectifiers 458 and 460 and ground. The amplitude of this signal is adjustable by adjusting the resistor 474. The ripple component of the signal is used as a "shake" signal for the motors 36, 38 which drive the pen 380 at the receiver. The shake signal is introduced through the switch 476 on the respective motors whenever the winding 419 is energized. The "shake" signal is introduced through the capacitors 478 and 480 to the respective cathodes of the tubes 316 and 358. The signal has a relatively small amplitude, and its effects are not noticeable insofar as the reproduction by the pen is concerned. However, the signal does set up vibrations in each of the pen motors and maintains the bearings of these motors loose and free. This increases to a material extent the sensitivity with which the pen motors respond to the control voltages from the discriminators.

It has been found that when the shake signals are distorted and exhibit a prominent 60 cycle component, there is an adverse noticeable effect on the reproduction of the receiver pen. In prior art power supplies it was usual to derive the negative C— voltage by half-wave rectification. With such arrangements, variations in the negative C— bias load produced 60 cycle components in the shake signal. These components as mentioned above, are not desirable. With the power supply of Figure 3, the C— power supply uses full-wave rectification, and it is connected symmetrically on either side of the center tap of the secondary 456 of the power transformer 450. With such an arrangement, variations in the C— load have no material distorting effects on the shake signal.

The C— power supply, as noted above, uses full-wave rectification, this being effected by the rectifiers 458 and 460. The pulsating or rippling negative voltage across the elements 472, 474 is adequately filtered by the elements 462, 464, 466 and 470. Voltage regulation of the negative C— voltage is provided by the tube 468.

Because there is a tendency for any change in the B+ voltage to produce spurious shifts in the receiver pen, elaborate provisions have been made in the power supply to regulate this voltage and hold it constant. To this end, the tube 507 is included in series in the B+ lead 505. The internal resistance of the tube 507 is controlled by the tube 508. This control is such that any tendency for the positive voltage at the B+ terminal to change produces a variation in the internal resistance of the tube 504 to compensate for this tendency and hold the positive voltage constant. The control grid of the tube 508 is connected to a negative voltage point on the voltage divider between the B+ and the C— terminals, this voltage divider being formed by the resistors 536, 516 and 518. The resistor 536 is included in the plate circuit of the tube 520, and any variation in plate current through the tube 520 changes the negative voltage at the point on the voltage divider mentioned above to control the plate current in the tube 508. This control of the plate current in the tube 508 controls the grid bias of the tube 504 and, therefore, the internal resistance of the latter tube.

Therefore, should the plate current flow through the tube 520 increase, there is a corresponding decrease in the plate current in the tube 508 and a corresponding decrease in the internal resistance of the tube 504. This latter effect produces a compensating increase in voltage at the terminal B+. Alternately, should the current flow through the tube 520 decrease, there is a corresponding increase in the internal resistance of the tube 504 producing a compensating decrease in voltage at the terminal B+.

The control grid of the tube 520 is connected to a stabilized reference positive voltage point between the resistor 526 and the regulator tube 524. The voltage at this point is stabilized at a selected reference value by the action of the tube 524. The control grid of the tube 532, on the other hand, is connected to a positive voltage point on the voltage divider 544, 546, 548, as set by the movable arm of the resistor 546. This movable arm is adjusted to a positive voltage point on the voltage divider corresponding to the voltage of the positive reference point to which the control grid of the tube 520 is connected.

The tubes 520 and 522 are connected as a differential amplifier, and so long as the voltage at the movable arm of the resistor 546 is equal to the positive voltage at the reference point between the resistor 526 and the tube 524, a plate current of a selected value flows through the tube 520. Any decrease in the voltage at the B+ terminal produces a corresponding decrease in the voltage at the movable arm. This latter decrease produces a corresponding decrease in the current flow through the tube 532. This decreases the cathode bias on the tube 520 and increases the current flow through the latter tube. This increase in current through the tube 520 produces a compensating increase in the voltage at the B+ terminal, for the reasons explained previously. Likewise, any tendency for the voltage at the B+ terminal to increase causes the regulating circuit described above to produce a compensating decrease in the voltage at that terminal. In this manner, the B+ voltage is regulated and held essentially constant.

Slight changes in line voltage also tend to cause the conductivities of the tubes 316, 358 to change due to resulting variations in the thermal emission characteristics of their respective cathodes. These emission changes produce variations in the plate currents of the tube and give rise to spurious variations in the motion of the receiver pen.

To compensate for the above effect, the tubes 560 and 562 are used in the power supply. As previously stated, these tubes have the same heater characteristics as the direct-current amplifier tubes 316 and 358. The tubes 560 and 562 produce a voltage drop across the resistor 530 as their cathodes are heated. This voltage drop is due to current flow through the tubes from random electrons emitted from the cathodes in each tube and reaching the plates. This is termed the "Edison" effect. As line voltage tends to change, the conductivity of the tubes 560 and 562 changes in correspondence with like changes in the conductivity of the tubes 316 and 358 so as to produce corresponding variations in the voltage drop across. This controls the effective positive reference voltage to which the control grid of the tube 520 is connected and causes the regulator circuit further to regulate the positive voltage at the B+ terminal in accordance with the actual thermal changes in the direct current amplifier tubes 316, 358.

Therefore, the B+ voltage is further regulated in accordance with the thermal characteristics of the direct-current amplifier tubes 316 and 358. Therefore, any tendency for the plate currents of the direct-current amplifier tubes to decrease or increase due to variations in the emission characteristics of their cathodes, is compensated by a corresponding and correct increase or decrease in the B+ voltage applied to these tubes.

Figure 6:
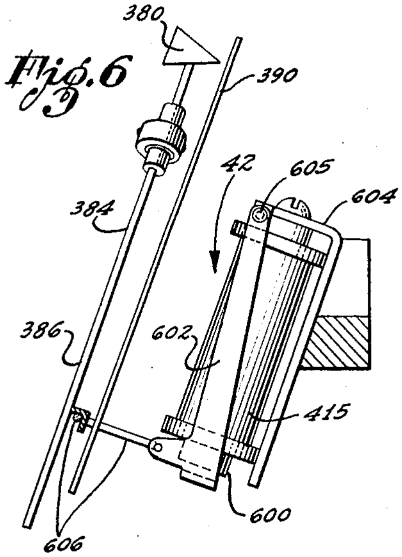
Figure 6 is a view similar to that of Figure 5 showing the relative disposition of the members of Figure 5 when the solenoid is energized.
Figure 5:
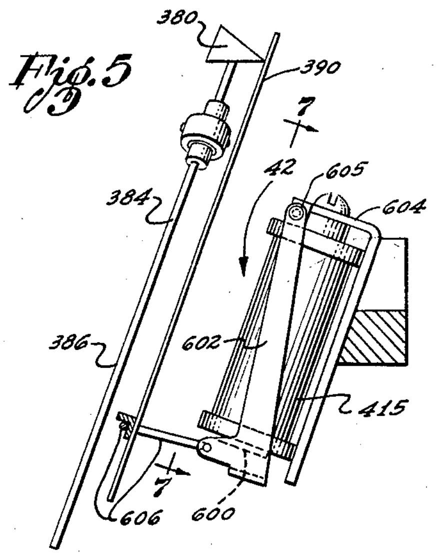
Figure 5 is a view partly in section and somewhat schematically illustrating a solenoid for controlling the pen at the receiving station so that it contacts its writing surface and inscribes a message only when the stylus at the transmitting station is actually held down against its inscribing surface, and showing the relative position of the pen when the solenoid is de-energized.
Figure 7:
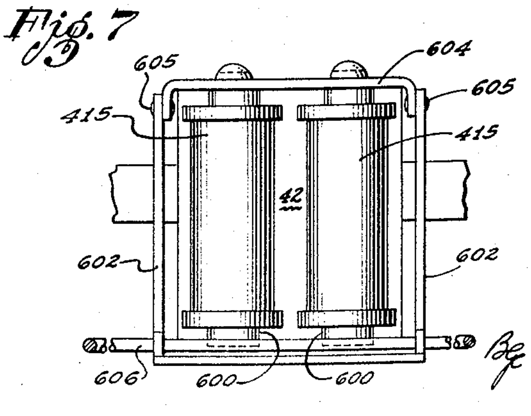
Figure 7 is a sectional view substantially on the line 7—7 of Figure 5 illustrating in further detail the construction of the solenoid of Figures 5 and 6.

The pen lifter solenoid 42 may be disposed in an inclined plane, as best seen in Figures 5 and 6, and it may include a pair of parallel windings 415, as best seen in Figure 7. A pair of armatures 600 are associated with the solenoid 42. The armatures 600 coact with a pair of arms 602 which are pivotally mounted to a mounting bracket 604 as at 605. Movement of the armatures 600 in and out of the windings 415 causes the arms 602 to pivot about the pivot points 605. A substantially vertical support member 606 is carried by the arms 602. The support member has a hollow rectangular configuration which embraces the tablet. The arrangement is such that one arm of the rectangle extends across the top surface of the tablet. The member 606 supports the stylus 380 and it controls the positioning of the stylus relative to the surface of the tablet. The construction of the solenoid 42, the armature 600, the arms 602, the bracket 604 and the support member 606 may be similar to corresponding members described in detail in the Lauder et al. Patent 2,355,087 referred to previously.

Whenever the windings 415 of the solenoid are energized, the armatures 600 move out of the windings from the position shown in Figure 5 to the position shown in Figure 6. This causes the arms 600 to pivot about the pivot points 605 and move the rectangular support member 606 upwardly with respect to the surface of the tablet 390. This movement of the support member 606 causes it to engage the linkage members 384, 386 and lift the pen 380 up from the tablet, as shown in Figure 6. Therefore, each time the solenoid 42 is energized, it functions to lift the pen 380 up from the tablet surface. As previously noted, this lifting of the pen 380 corresponds to the raising of the transmitter stylus up from its tablet. Therefore, the receiver pen transcribes on its tablet only when the transmitter stylus is actually transcribing on its tablet.

It is apparent that when either of the signals from the oscillators 10 and 12 at the transmitter are interrupted, the bias voltage produced by the control system of the tubes 412, 424 must rapidly disappear. If this were not so, a spurious positive voltage would be produced by the discriminator upon the discontinuance of these signals. This spurious voltage would produce unwanted kicks and jerks in the control of the receiver pen 380. Rapid removal of the bias voltage from the control system is effected by the action of the capacitor 428. In the absence of the frequency shifted signals, when the tube 412 is conductive, this capacitor is normally discharged. Now, received interference signals, such as noise spikes and the like, which could produce intermittent discontinuities in the conduction of the tube 412, have little effect on the succeeding portions of the system. This is because such spikes are absorbed by the capacitor 428. Before these interference signals have any noticeable effect on the system, they must be sustained long enough to enable the capacitor 428 to receive its charge. This charge is obtained through the resistor 422. The resistor 422 has a relatively large value, so that the charge time for the capacitor 428 is relatively long. However, after the signals from the transmitting station have been received, the tube 412 is rendered nonconductive (as previously described) and the capacitor 428 gradually becomes fully charged. Then, when the signals from the transmitter are interrupted, the tube 412 immediately becomes conductive, and the capacitor 428 rapidly discharges through the tube. This means that the cathode follower 424 is rapidly returned to its state of minimum conduction when the signals from the transmitter are discontinued, effectively to remove the bias voltages from across the potentiometers 430 and 432. Therefore, the outputs from the discriminators 28 and 30 are returned essentially to zero so that there is zero current through the motor windings 320, 362 in the absence of signals from the transmitting station.

It should be noted that it is essential that the bias voltages across the potentiometers 430 and 432 be constant. Any amplitude variations in these voltages would produce spurious values in the output voltages in the discriminators and spurious controls on the pen 380. In the described circuit, and when the two signals from the transmitting station combine to render the tube 412 nonconductive in the manner described, the conductivity of the cathode follower tube 424 is controlled by the voltage divider between the terminal B+ and ground formed by the resistors 422 and 426.

As previously described, the value of the B+ voltage is closely regulated. Furthermore, the characteristics of the resistances 422 and 426 remain substantially constant even with variations in current flow. Because of this, the potential applied to the grid of the tube 414 to make the tube conductive can be quite stable at the time that the tube 412 becomes cut off. Since a stable voltage is introduced to the control grid of the tube 424, a stable current flows through the tube. This stable current is effective in producing stable and regulated voltages on the movable arms of the potentiometers 430 and 432.

In the absence of the signals from the transmitter, the tube 412 positively is biased to a state of large current flow, as previously described. Because of the large positive bias on the grid of the tube 412, the current in the tube remains unaffected by normal interference signals introduced to the grid. Since the operation of the tube 412 remains unaffected by such interference signals the tube 424 also remains unaffected. Therefore, such interference signals do not tend to produce spurious voltages across the potentiometers 430 and 432. Such spurious voltages would tend to move and jerk the pen 380. Also, and as described above, even large amplitude noise and interference signals have little effect on the system due to the action of the capacitor 428.

Therefore, the bias voltages developed by the cathode follower tube 424 across the potentiometers 430 and 432 are independent of variations in the incoming signals. Yet these voltages appear only when the signals are received by the system. Moreover, the bias voltages are independent of interference and rapidly disappear when the signals from the transmitter are interrupted.

The signal from the filter 24, as previously mentioned, is amplified in the amplifier formed by the tubes 400 and 402. This signal is then detected by the circuit of the cathode follower tube 406. The tube 406 is appropriately biased so that it functions as a rectifier, and a rectified voltage appears across its cathode resistor 408 whenever the stylus 18 at the transmitter is lifted to close the switch 116, or whenever the push button switches 126, 128 (Figure 2) are actuated. This voltage is filtered by the capacitor 410 and is amplified by the direct-current amplifier tube 409. The amplified voltage is introduced to the movable arm of the switch 411.

Whenever the transmitted signals are received by the receiver, current flows through the motor winding 362. This current flow causes the switch 423 to close. The closure of the switch 423 completes the energizing circuit to the winding 419 to close the arm of the switch 411 against its lower contact. This condition of the switch 411 connects the anode of the tube 409 to the lower terminal of the winding 415 of the pen lifter solenoid 42. The solenoid 42, therefore, is energized during the transcribing operation and it lifts the receiver pen 380 up from the tablet 390 whenever the stylus at the transmitter is lifted. This prevents markings on the tablet 390 at any time except when the stylus 18 at the transmitter is actually inscribing a message on the tablet 20. The resistor 417 can be adjusted to control the speed with which the solenoid 42 lifts the pen 380. This adjustment prevents jerking of the pen and permits it to be lifted smoothly by the solenoid.

It will be remembered in the description of Figure 2, that it was pointed out that the switch 152 of that figure was moved to its lower position by the tip of the stylus 18 and released and when his was done, the solenoid winding 144 was energized to permit the signals from the oscillators 10, 12 and 14 to be transmitted to the receiving stations over the transmission line 19. Now at the completion of a message, the arm 152 may again be moved by the tip of the stylus 18 down against its lower contact. This latter movement of the arm 152 causes the now discharged condenser 54 momentarily to short circuit the energized solenoid winding 144. This short circuit is of sufficient duration to cause the solenoid winding to be deenergized long enough to release the arms of the switches 134, 138, 140, and 142. These arms are then spring biased into engagement with their upper contacts. This breaks the holding circuit through switch 142 to the winding 144, and it removes the oscillator signals from the transmission line 19. This termination of the signals terminates the current flow through the motor winding 362 at the receiver (Figure 3), and this allows the switch 423 to open. The opening of the switch 423 deenergizes the solenoid 419, and the movable arm of the switch 411 returns to its upper contact.

Now, to advise the operators at the receiving stations that a message has just been completed, the operator at the transmitter depressed the push button actuating the switches 126 and 128. As previously noted, this places the 1300 cycle signal on the transmission line 19 for transmission to the receiving stations. This signal is passed by the filter 24 (Figure 3) amplified and detected by the tubes 400, 402, and 406 amplified by the tube 409, and passed to the buzzer 413 through the switch 411. The signal, therefore, actuates the buzzer to apprise the operators that a message has been recorded.

The switch 152 is so positioned that to actuate it, the stylus 18 at the transmitter must be moved to a position away from its tablet in which both the discriminators 28, 30 (in their biased condition by the control circuits of the tubes 412, 424) are developing zero output voltages. Also, the direct-current amplifier tubes 316, 358 are passing zero current through the pen motor windings. Also, when the transmitted signals are interrupted, the discriminator bias control voltages immediately disappear. Therefore, the discriminators continue to develop zero voltage. As previously noted, this prevents the receiver pens from being jerked to another position upon the cessation of the signals from the transmitter, or upon the receiver being turned off.

The invention provides, therefore, an improved telescribing system that is predicated upon frequency shift principles. The system may conveniently use telephone lines and equipment for transmitting the signals from the transmitting station to the various receiving stations. The system is extremely rugged, reliable and accurate in its operation. The signals are translated, received and converted into control voltages with a minimum of distorting effects. This enables the receiver pens to duplicate faithfully the movements of the transmitter stylus and with a high degree of accuracy. Moreover, the system is designed and constructed to utilize relatively simple circuits, and to assure that the control of the receiver pens is smooth at all times, and that there is no tendency for the pens to be jerked with resulting ink spillage and damage their linkage it should be appreciated that various types of electron discharge means can be used in addition to vacuum tubes. For example, various type of semi-conductors can be used.

We claim:

1. In a telescribing system in which variations in the frequencies of a pair of transmitted signals indicate variations in the position of a stylus at a transmitting station, a receiving station including, a frequency discriminator circuit for each transmitted signal adapted normally to develop essentially zero output voltage when the corresponding transmitted signal has a predetermined frequency and to develop positive output voltage when the corresponding transmitted signal frequency varies in one direction from said predetermined frequency and to develop negative output voltage when the corresponding transmitted signal frequency varies in the other direction from said predetermined frequency, means for receiving the transmitted signals and reproducing them at a pair of outputs, the outputs of the receiving means being coupled to the respective discriminator circuits, utilization means coupled to the output voltage from each of the discriminator circuits, electric discharge means, means coupled to the discharge means for normally biasing said discharge means to a conductive state in the absence of the transmitted signals, means coupled to the outputs of the receiving means for introducing voltages to said discharge means in response to said transmitted signals to render said discharge means nonconductive upon the receipt of both said transmitted signals, a control circuit coupled to said discharge means and responsive to the nonconductive state thereof for developing a control voltage for each of the discriminator circuits, and means for adding said control voltages to the outputs of the discriminators, whereby the control voltages are effective to shift the output voltages from the discriminators so that such output voltages have but one polarity as each transmitted signal varies on either side of its predetermined frequency within predetermined limits.

2. In a telescribing system in which variations in the frequencies of a pair of frequency displaced transmitted signals indicate variations in the position of a stylus at a transmitting station, a receiving station including; a pair of frequency discriminator circuits for respective ones of the transmitted signals, each of said discriminator circuits being adapted normally to develop essentially zero output voltage when its corresponding transmitted signal has a predetermined center frequency and to develop positive output voltage when the corresponding transmitted signal frequency varies in one direction from said center frequency and to develop negative output voltage when the corresponding transmitted signal frequency varies in the other direction from said center frequency; means for receiving the transmitted signals and reproducing them at a pair of outputs, the outputs of the receiving means being coupled to the respective discriminator circuits; utilization means for the output voltages from each of the discriminator circuits, first electron discharge means; a bias circuit for said first electron discharge means for normally rendering the same conductive in the absence of the transmitted signals; first and second rectifier circuits; means for coupling the outputs of the receiving means to said rectifier circuits to cause the same to develop respective bias voltages; means for coupling the respective bias voltages from said rectifier circuits to said discharge means to render said means nonconductive upon the receipt of both of said transmitted signals; a second electron discharge means coupled to said first discharge means and adapted to develop first and second control voltages in response to the conductive state of said first means, and means for adding said first and second control voltages to respective output voltages of said discriminator circuits, whereby their output voltages are shifted so that such output voltages have but one polarity as each transmitted signal varies on either side of its center frequency within predetermined limits.

3. The combination defined in claim 2 in which said first electron discharge means includes a cathode, an anode and a control grid; in which said bias circuit is connected to said control grid and is adapted to produce a current flow between said control grid and said cathode in the absence of the transmitted signals and upon the receipt of but one of the transmitted signals; and in which said bias voltages from said rectifier circuits are introduced to said control grid to drive the same negative with respect to said cathode upon the receipt of both the transmitted signals and render said first tube nonconductive.

4. The combination defined in claim 2 in which said first electron discharge means includes an anode, a cathode and a control grid; in which said bias circuit is connected to said control grid and is adapted to produce a current flow between said control grid and said cathode in the absence of the transmitted signals and upon the receipt of but one of the transmitted signals; in which said bias voltages from said rectifier circuits are introduced to said control grid to drive the same negative with respect to said cathode upon the receipt of both of the transmitted signals and render the first tube nonconductive; load impedance means connecting said anode of said first tube to a positive voltage source; and in which said second tube includes an anode connected to said voltage source, a control grid connected to the anode of said first tube, and a cathode; and impedance means connecting said cathode of said second tube to a point of reference potential.

5. The combination defined in claim 4 which includes resistance means connected to a source of negative potential, and in which said last named impedance means comprises first and second potentiometers connected in shunt between said cathode of said second tube and said last-named resistance means, said potentiometers having respective movable arms connected respectively to said discriminator circuits.

6. The combination defined in claim 4 which includes capacitive means connected between said control grid of said second tube and said point of reference potential, said capacitive means being adapted to be charged when said first tube is nonconductive and to be discharged when said first tube is conductive.

7. In a telescribing system for controlling the movements of a stylus at a receiving station in accordance with the movements of a stylus at a transmitting station, means for generating at the receiving station first signals representing the movements of the stylus at the transmitting station along a first axis, means for generating at the receiving station second signals representing the movements of the stylus at the transmitting station along a second axis, electron discharge means having a first state of conductivity, means for coupling the combined outputs of the first and second signal generating means to the electron discharge means, the presence of the first and second signals biasing the electron discharge means to a second state of conductivity, means coupled to the electron discharge means and responsive to the second state of conductivity in the electron discharge means for generating a fixed voltage independent of any variations in the second state of conductivity, means for adding said fixed voltage to the output signals from said first second signal generating means, and means coupled to the outputs of the summing means for controlling the stylus at the receiving station along the first and second axes.

8. In a telescribing system for controlling the movements of a stylus at a receiving station in accordance with the movements of a stylus at a transmitting station, the combination comprising means for generating at the receiving station first signals having a frequency variable from a first particular frequency in accordance with the movements of the stylus along a first axis at the transmitting station, means for generating at the receiving station second signals having a frequency variable from a second particular frequency in accordance with the movements of the stylus along a second axis at the transmitting station, means coupled to the output of the first signal generating means for converting the first signals at the receiving station to first decoded signals having an amplitude variable in accordance with the frequency variations of the first signals, means coupled to the output of the second signal generating means for converting the second signals at the receiving station to second decoded signals having an amplitude variable in accordance with the frequency variations of the second signals, first adjustable means for providing a first reference voltage, second adjustable means for providing a second reference voltage, means coupled to the outputs of the first and second signal generating means for activating the first and second adjustable means upon the simultaneous occurrence of the first and second signals, means coupled to the outputs of said first converting means and said first adjustable means for combining the first reference voltage and the first decoded signals upon the activation of the first adjustable means.

means coupled to the outputs of the second converting means and the second adjustable means for combining the second reference voltage and the second decoded signals upon the activation of the second adjustable means, and means coupled to the outputs of said combining means for positioning the stylus at the receiving station along first and second axes of movement according to the magnitude of the signals derived from the outputs of said combining means.

9. In a telescribing system in which variations in the frequencies of a pair of frequency displaced transmitted signals indicate variations in the position of a stylus at a transmitting station, a receiving station including: a pair of frequency discriminator circuits for respective ones of the transmitted signals; means for receiving the transmitted signals and coupling the same to their respective discriminator circuits; means including at least first direct-current amplifier means coupled to the respective outputs of the discriminator circuits for utilizing the output signals from said discriminator circuits; a power supply for supplying an exciting voltage to said amplifier means, said power supply including electron discharge control means having an element corresponding to a control grid and controlling said exciting voltage in accordance with the bias voltage introduced to the control grid; said amplifier means being responsive to internal thermal effects for producing variations in the conductivity thereof; and said power supply including electron discharge regulator means connected to said control grid of said control means and having similar thermal characteristics as said amplifier means, said regulator means varying the bias voltage introduced to said control grid thereby causing said control means to vary the value of said exciting voltage and compensate for the said variations in the conductivity of said amplifier means.

10. In a telescribing system in which variations in the frequencies of a pair of frequency displaced transmitted signals indicate variations in the position of a stylus at a transmitting station, a receiving station including: a pair of frequency discriminator circuits for the respective ones of the transmitted signals; a pair of direct-current amplifiers respectively coupled to said frequency discriminator circuits and each including electron discharge means the conductivity of which is subject to vary due to thermal changes in said discharge means; a power supply for supplying an exciting voltage to said discharge means and including electron discharge control means for controlling said exciting voltage, said control means having an element corresponding to a control grid and said exciting voltage varying in response to variations in the bias voltage introduced to said control grid; resistor means for connecting said control grid to a point of reference bias potential; and a pair of electron discharge regulator means having similar thermal characteristics as discharge means of the amplifiers connected across said resistor means, said regulator means varying the bias voltage introduced to said control grid thereby causing said control tube to vary the value of said exciting voltage and compensate for the variations in the conductivity of said amplifier means due to thermal changes therein.

11. In a telescribing system in which variations in the frequencies of a pair of frequency displaced transmitted signals indicate variations in the position of a stylus at a transmiting station, a receiving station including: a pair of frequency discriminator circuits having the received signals coupled thereto for detecting the respective ones of the transmitted signals; means coupled to the discriminator circuits for utilizing the output signals from said discriminator circuits; and means including an amplifier circuit for receiving the transmitted signals and coupling an amplified version the same to the respective discriminator circuits, each of the amplifiers including first electron discharge means including elements corresponding to an anode and a cathode, resistor means connecting said anode to a positive voltage source, means connecting said cathode to a point of reference potential, second electron discharge means including elements corresponding to an anode and a cathode and a control grid, resistor means connecting said anode of said second discharge means to said anode of said first discharge means, means connecting said cathode of said second discharge means to said point of reference potential, rectifier means coupled to each of the received signals for producing a negative unidirectional potential having an amplitude varying in accordance with amplitude variations in the respective received signals, and means for coupling said unidirectional potential to said control grid of said second discharge means.

12. In a telescribing system for controlling the movement of a stylus at a receiving station in accordance with the movements of a stylus at a transmitting station, the combination comprising means for generating at the receiving station first signals representing the movements of the stylus at the transmitting station along a first axis, means for generating at the receiving station second signals representing the movements of the stylus at the transmitting station along a second axis, means coupled to the first generating means for controlling the position of the stylus at the receiving station along a first axis corresponding to the first axis of movement at the transmitting station, means coupled to the second generating means for controlling the position of the stylus along a second axis corresponding to the second axis of movement at the transmitting station, means coupled to the output of said first and second signal generating means for generating a single bias voltage of fixed predetermined magnitude in response only to the simultaneous presence of said first and second signals, and means coupling the single bias voltage from the bias voltage means to both of the respective means for displacing the stylus along said first and second axes by a fixed predetermined amount according to the magnitude of the bias voltage.

References Cited in the file of this patent

UNITED STATES PATENTS

| | | |
|---|---|---|
| 2,623,943 | Adler | Dec. 30, 1952 |
| 2,649,503 | Adler | Aug. 18, 1953 |

UNITED STATES PATENT OFFICE

CERTIFICATE OF CORRECTION

Patent No. 2,916,550 December 8, 1959

Carl F. Anderson et al.

It is hereby certified that error appears in the printed specification of the above numbered patent requiring correction and that the said Letters Patent should read as corrected below.

Column 2, line 11, for "be" read -- have --; line 27, for "discrimnators" read -- discriminators --; column 4, line 20, for "shfted" read -- shifted --; column 6, line 6, after "pass" strike out "the"; column 9, line 67, for "microfarads" read --micromicrofarads --; column 14, line 3, for "ube" read -- tube --; column 15, line 64, "441" read -- 411 --; column 16, line 6, for "425′" read -- 425 --; line 48, for "conencted" read -- connected --; line 60, for "votlage" read -- voltage --; column 24, line 75, for "his" read -- this --.

Signed and sealed this 14th day of June 1960.

(SEAL)
Attest:

KARL H. AXLINE
Attesting Officer

ROBERT C. WATSON
Commissioner of Patents